(12) United States Patent
Forstall et al.

(10) Patent No.: US 8,180,379 B2
(45) Date of Patent: May 15, 2012

(54) SYNCHRONIZING MOBILE AND VEHICLE DEVICES

(75) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 771 days.

(21) Appl. No.: 12/035,610

(22) Filed: Feb. 22, 2008

(65) Prior Publication Data

US 2009/0005070 A1 Jan. 1, 2009

Related U.S. Application Data

(60) Provisional application No. 60/946,792, filed on Jun. 28, 2007.

(51) Int. Cl.
*H04W 24/00* (2009.01)
*H04B 7/00* (2006.01)

(52) U.S. Cl. .................................... 455/456.6; 455/41.2

(58) Field of Classification Search ............... 455/456.1, 455/414.1, 556.2, 456.3, 456.4, 456.5, 456.6, 455/41.2; 701/216, 217
See application file for complete search history.

(56) References Cited

U.S. PATENT DOCUMENTS

| | | | |
|---|---|---|---|
| 4,644,351 A | 2/1987 | Zabarsky et al. | |
| 4,903,212 A | 2/1990 | Yokouchi et al. | |
| 4,999,783 A | 3/1991 | Tenmoku et al. | |
| 5,031,104 A | 7/1991 | Ikeda et al. | |
| 5,046,011 A | 9/1991 | Kakihara et al. | |
| 5,067,081 A | 11/1991 | Person | |
| 5,182,555 A | 1/1993 | Sumner | |
| 5,187,810 A | 2/1993 | Toneyama et al. | |
| 5,195,031 A | 3/1993 | Ordish | |
| 5,208,763 A | 5/1993 | Hong et al. | |
| 5,218,629 A | 6/1993 | Dumond, Jr. et al. | |
| 5,243,652 A | 9/1993 | Teare | |
| 5,289,572 A | 2/1994 | Yano et al. | |
| 5,295,064 A | 3/1994 | Malec et al. | |
| 5,337,044 A | 8/1994 | Folger et al. | |
| 5,371,678 A | 12/1994 | Nomura | |
| 5,374,933 A | 12/1994 | Kao | |
| 5,379,057 A | 1/1995 | Clough et al. | |
| 5,390,125 A | 2/1995 | Sennott et al. | |
| 5,406,490 A | 4/1995 | Braegas | |
| 5,416,712 A | 5/1995 | Geier et al. | |
| 5,416,890 A | 5/1995 | Beretta | |

(Continued)

FOREIGN PATENT DOCUMENTS

BR 9904979 12/2000

(Continued)

OTHER PUBLICATIONS

U.S. Appl. No. 11/464,671, filed Aug. 15, 2006, Johnson.

(Continued)

*Primary Examiner* — Christopher M Brandt
(74) *Attorney, Agent, or Firm* — Fish & Richardson P.C.

(57) ABSTRACT

Location information is received at a mobile device from the memory of a vehicle device. The mobile device is updated based on the location information. Sensor data is received from at least one sensor measuring movement of the mobile device, and an estimated location of the mobile device is calculated based at least in part on the location information and the sensor data.

24 Claims, 8 Drawing Sheets

U.S. PATENT DOCUMENTS

| | | |
|---|---|---|
| 5,469,362 A | 11/1995 | Hunt et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw |
| 5,630,206 A | 5/1997 | Urban et al. |
| 5,636,245 A | 6/1997 | Ernst |
| 5,642,303 A | 6/1997 | Small |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,270 A | 11/1997 | Kelley et al. |
| 5,689,431 A | 11/1997 | Rudow et al. |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,774,824 A | 6/1998 | Streit et al. |
| 5,774,829 A | 6/1998 | Cisneros et al. |
| 5,793,630 A | 8/1998 | Theimer |
| 5,796,365 A | 8/1998 | Lewis et al. |
| 5,796,613 A | 8/1998 | Kato et al. |
| 5,806,018 A | 9/1998 | Smith et al. |
| 5,825,306 A | 10/1998 | Hiyokawa et al. |
| 5,835,061 A | 11/1998 | Stewart |
| 5,845,227 A | 12/1998 | Peterson |
| 5,848,373 A | 12/1998 | DeLorme et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan |
| 5,969,678 A | 10/1999 | Stewart |
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,014,090 A | 1/2000 | Rosen et al. |
| 6,014,607 A | 1/2000 | Yagyu et al. |
| 6,023,653 A | 2/2000 | Ichimura et al. |
| 6,026,375 A | 2/2000 | Hall et al. |
| 6,029,069 A | 2/2000 | Takaki |
| 6,031,490 A | 2/2000 | Forssen et al. |
| 6,041,280 A | 3/2000 | Kohli et al. |
| 6,064,335 A | 5/2000 | Eschenbach |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins |
| 6,094,607 A | 7/2000 | Diesel |
| 6,101,443 A | 8/2000 | Kato |
| 6,104,931 A | 8/2000 | Havinis et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,841 A | 12/2000 | Bolduc et al. |
| 6,166,627 A | 12/2000 | Reeley |
| 6,167,266 A | 12/2000 | Havinis et al. |
| 6,175,740 B1 | 1/2001 | Souissi et al. |
| 6,177,905 B1 | 1/2001 | Welch |
| 6,181,934 B1 | 1/2001 | Havinis et al. |
| 6,185,427 B1 | 2/2001 | Krasner et al. |
| 6,188,959 B1 | 2/2001 | Schupfner |
| 6,195,557 B1 | 2/2001 | Havinis et al. |
| 6,195,609 B1 | 2/2001 | Pilley et al. |
| 6,199,014 B1 | 3/2001 | Walker |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,298,306 B1 | 10/2001 | Suarez et al. |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |

| | | | |
|---|---|---|---|
| 6,326,918 B1 | 12/2001 | Stewart | |
| 6,332,127 B1 | 12/2001 | Bandera et al. | |
| 6,339,746 B1 | 1/2002 | Sugiyama et al. | |
| 6,343,317 B1 | 1/2002 | Glorikian | |
| 6,345,288 B1 | 2/2002 | Reed et al. | |
| 6,351,235 B1 | 2/2002 | Stilp | |
| 6,353,398 B1 | 3/2002 | Amin et al. | |
| 6,353,743 B1 | 3/2002 | Karmel | |
| 6,353,837 B1 | 3/2002 | Blumenau | |
| 6,356,761 B1 | 3/2002 | Huttunen | |
| 6,356,763 B1 | 3/2002 | Kangas et al. | |
| 6,356,838 B1 | 3/2002 | Paul | |
| 6,370,629 B1 | 4/2002 | Hastings et al. | |
| 6,377,886 B1 | 4/2002 | Gotou | |
| 6,381,465 B1 | 4/2002 | Chern et al. | |
| 6,381,539 B1 | 4/2002 | Shimazu | |
| 6,381,603 B1 | 4/2002 | Chan et al. | |
| 6,385,458 B1 | 5/2002 | Papadimitriou et al. | |
| 6,385,465 B1 | 5/2002 | Yoshioka | |
| 6,401,032 B1 | 6/2002 | Jamison | |
| 6,405,034 B1 | 6/2002 | Tijerino | |
| 6,405,123 B1 | 6/2002 | Rennard et al. | |
| 6,411,899 B2 | 6/2002 | Dussell et al. | |
| 6,414,635 B1 | 7/2002 | Stewart et al. | |
| 6,415,207 B1 | 7/2002 | Jones | |
| 6,415,220 B1 | 7/2002 | Kovacs | |
| 6,415,227 B1 | 7/2002 | Lin | |
| 6,427,115 B1 | 7/2002 | Sekiyama | |
| 6,430,411 B1 | 8/2002 | Lempio et al. | |
| 6,434,530 B1 | 8/2002 | Sloane et al. | |
| 6,449,485 B1 | 9/2002 | Anzil | |
| 6,452,498 B2 | 9/2002 | Stewart | |
| 6,456,234 B1 | 9/2002 | Johnson et al. | |
| 6,456,956 B1 | 9/2002 | Xiong | |
| 6,459,782 B1 | 10/2002 | Bedrosian et al. | |
| 6,463,289 B1 | 10/2002 | Havinis et al. | |
| 6,477,581 B1 | 11/2002 | Carpenter | |
| 6,490,454 B1 | 12/2002 | Kangas et al. | |
| 6,490,519 B1 | 12/2002 | Lapidot et al. | |
| 6,501,421 B1 | 12/2002 | Dutta et al. | |
| 6,505,046 B1 | 1/2003 | Baker | |
| 6,505,048 B1 | 1/2003 | Moles et al. | |
| 6,505,123 B1 | 1/2003 | Root et al. | |
| 6,507,802 B1 | 1/2003 | Payton et al. | |
| 6,516,197 B2 | 2/2003 | Havinis et al. | |
| 6,519,463 B2 | 2/2003 | Tendler | |
| 6,526,335 B1 | 2/2003 | Treyz et al. | |
| 6,529,143 B2 | 3/2003 | Mikkola et al. | |
| 6,542,812 B1 | 4/2003 | Obradovich et al. | |
| 6,542,819 B1 | 4/2003 | Kovacs et al. | |
| 6,546,360 B1 | 4/2003 | Gilbert et al. | |
| 6,552,682 B1 | 4/2003 | Fan | |
| 6,563,430 B1 | 5/2003 | Kemink et al. | |
| 6,564,143 B1 | 5/2003 | Alewine et al. | |
| 6,570,557 B1 | 5/2003 | Westerman et al. | |
| 6,571,279 B1 | 5/2003 | Herz et al. | |
| 6,574,484 B1 | 6/2003 | Carley | |
| 6,587,782 B1 | 7/2003 | Nocek et al. | |
| 6,587,835 B1 | 7/2003 | Treyz et al. | |
| 6,594,480 B1 | 7/2003 | Montalvo et al. | |
| 6,597,305 B2 | 7/2003 | Szeto et al. | |
| 6,611,687 B1 | 8/2003 | Clark et al. | |
| 6,611,788 B1 | 8/2003 | Hussa | |
| 6,615,131 B1 | 9/2003 | Rennard et al. | |
| 6,615,213 B1 | 9/2003 | Johnson | |
| 6,647,257 B2 | 11/2003 | Owensby | |
| 6,650,902 B1 | 11/2003 | Richton | |
| 6,650,997 B2 * | 11/2003 | Funk .................... 701/207 | |
| 6,662,023 B1 | 12/2003 | Helle | |
| 6,667,963 B1 | 12/2003 | Rantalainen et al. | |
| 6,671,377 B1 | 12/2003 | Havinis et al. | |
| 6,674,849 B1 | 1/2004 | Froeberg | |
| 6,677,894 B2 | 1/2004 | Sheynblat et al. | |
| 6,679,932 B2 | 1/2004 | Birler et al. | |
| 6,680,694 B1 | 1/2004 | Knockeart et al. | |
| 6,681,120 B1 | 1/2004 | Kim | |
| 6,697,018 B2 | 2/2004 | Stewart | |
| 6,697,734 B1 | 2/2004 | Suomela | |
| 6,711,408 B1 | 3/2004 | Raith | |
| 6,711,474 B1 | 3/2004 | Treyz et al. | |
| 6,718,344 B2 | 4/2004 | Hirono | |
| 6,721,572 B1 * | 4/2004 | Smith et al. ................. 455/456.1 | |
| 6,731,236 B1 | 5/2004 | Hager et al. | |
| 6,731,238 B2 | 5/2004 | Johnson | |
| 6,738,808 B1 | 5/2004 | Zellner et al. | |
| 6,741,188 B1 | 5/2004 | Miller et al. | |
| 6,748,226 B1 * | 6/2004 | Wortham .................... 455/456.6 | |
| 6,748,318 B1 | 6/2004 | Jones | |
| 6,750,883 B1 | 6/2004 | Parupudi et al. | |
| 6,759,960 B1 | 7/2004 | Stewart | |
| 6,762,772 B1 | 7/2004 | Imamura et al. | |
| 6,766,174 B1 | 7/2004 | Kenyon | |
| 6,789,012 B1 | 9/2004 | Childs et al. | |
| 6,795,686 B2 | 9/2004 | Master et al. | |
| 6,801,855 B1 | 10/2004 | Walters et al. | |
| 6,810,323 B1 | 10/2004 | Bullock et al. | |
| 6,813,501 B2 | 11/2004 | Kinnunen et al. | |
| 6,813,503 B1 | 11/2004 | Zillikens et al. | |
| 6,816,782 B1 | 11/2004 | Walters et al. | |
| 6,819,919 B1 | 11/2004 | Tanaka | |
| 6,823,188 B1 * | 11/2004 | Stern .................... 455/456.1 | |
| 6,845,318 B1 | 1/2005 | Moore et al. | |
| 6,847,891 B2 | 1/2005 | Pietras et al. | |
| 6,847,969 B1 | 1/2005 | Mathai et al. | |
| 6,853,911 B1 | 2/2005 | Sakarya | |
| 6,853,917 B2 | 2/2005 | Miwa | |
| 6,865,483 B1 | 3/2005 | Cook, III et al. | |
| 6,868,074 B1 | 3/2005 | Hanson | |
| 6,871,144 B1 | 3/2005 | Lee | |
| 6,888,536 B2 | 5/2005 | Westerman et al. | |
| 6,909,902 B1 | 6/2005 | Sawada et al. | |
| 6,912,398 B1 | 6/2005 | Domnitz | |
| 6,914,626 B2 | 7/2005 | Squibbs | |
| 6,933,841 B2 * | 8/2005 | Muramatsu et al. ..... 340/539.13 | |
| 6,944,447 B2 | 9/2005 | Portman et al. | |
| 6,948,656 B2 | 9/2005 | Williams | |
| 6,952,181 B2 | 10/2005 | Karr et al. | |
| 6,954,646 B2 | 10/2005 | Churt | |
| 6,954,735 B1 | 10/2005 | Djupsjobacka et al. | |
| 6,957,072 B2 | 10/2005 | Kangras et al. | |
| 6,975,959 B2 | 12/2005 | Dietrich et al. | |
| 6,980,909 B2 | 12/2005 | Root et al. | |
| 6,990,495 B1 | 1/2006 | Grason et al. | |
| 6,999,779 B1 | 2/2006 | Hashimoto | |
| 7,003,289 B1 * | 2/2006 | Kolls .................... 455/422.1 | |
| 7,009,556 B2 | 3/2006 | Stewart | |
| 7,031,725 B2 * | 4/2006 | Rorabaugh ................. 455/456.1 | |
| 7,044,372 B2 | 5/2006 | Okuda et al. | |
| 7,058,594 B2 | 6/2006 | Stewart | |
| 7,076,255 B2 | 7/2006 | Parupudi et al. | |
| 7,082,365 B2 | 7/2006 | Sheha et al. | |
| 7,089,264 B1 | 8/2006 | Guido et al. | |
| 7,096,029 B1 | 8/2006 | Parupudi et al. | |
| 7,096,030 B2 | 8/2006 | Huomo | |
| 7,103,470 B2 | 9/2006 | Mintz | |
| 7,117,015 B2 | 10/2006 | Scheinert et al. | |
| 7,120,469 B1 | 10/2006 | Urakawa | |
| 7,123,189 B2 | 10/2006 | Lalik et al. | |
| 7,146,298 B2 | 12/2006 | Motamedi et al. | |
| 7,165,725 B2 | 1/2007 | Casey | |
| 7,171,190 B2 | 1/2007 | Ye et al. | |
| 7,181,189 B2 * | 2/2007 | Hotta et al. .................. 455/343.3 | |
| 7,187,997 B2 | 3/2007 | Johnson | |
| 7,200,409 B1 * | 4/2007 | Ichikawa et al. ........... 455/456.1 | |
| 7,200,566 B1 | 4/2007 | Moore et al. | |
| 7,213,048 B1 | 5/2007 | Parupudi et al. | |
| 7,215,967 B1 | 5/2007 | Kransmo et al. | |
| 7,254,481 B2 | 8/2007 | Yamada et al. | |
| 7,256,711 B2 | 8/2007 | Sheha et al. | |
| 7,257,392 B2 | 8/2007 | Tang et al. | |
| 7,260,378 B2 | 8/2007 | Holland et al. | |
| 7,266,376 B2 | 9/2007 | Nakagawa | |
| 7,271,765 B2 | 9/2007 | Stilp et al. | |
| 7,272,404 B2 | 9/2007 | Overy et al. | |
| 7,274,332 B1 | 9/2007 | Dupray | |
| 7,274,939 B2 | 9/2007 | Ruutu et al. | |
| 7,280,822 B2 | 10/2007 | Fraccaroli | |
| 7,295,556 B2 | 11/2007 | Roese et al. | |

| | | |
|---|---|---|
| 7,295,925 B2 | 11/2007 | Breed et al. |
| 7,298,327 B2 | 11/2007 | Dupray et al. |
| 7,299,008 B2 * | 11/2007 | Gluck .................. 455/41.2 |
| 7,310,516 B1 | 12/2007 | Vacanti |
| 7,319,412 B1 * | 1/2008 | Coppinger et al. ......... 340/988 |
| 7,336,949 B2 | 2/2008 | Nasielski |
| 7,339,496 B2 | 3/2008 | Endo et al. |
| 7,343,564 B2 | 3/2008 | Othmer |
| 7,349,706 B2 | 3/2008 | Kim et al. |
| 7,359,713 B1 | 4/2008 | Tiwari |
| 7,370,283 B2 | 5/2008 | Othmer |
| 7,373,246 B2 | 5/2008 | O'Clair |
| 7,386,396 B2 | 6/2008 | Johnson |
| 7,392,017 B2 | 6/2008 | Chu et al. |
| 7,395,031 B1 | 7/2008 | Ritter |
| 7,418,402 B2 | 8/2008 | McCrossin et al. |
| 7,421,422 B1 | 9/2008 | Dempster et al. |
| 7,421,486 B1 | 9/2008 | Parupudi et al. |
| 7,426,437 B2 | 9/2008 | Breed et al. |
| 7,427,021 B2 | 9/2008 | Kemper et al. |
| 7,433,694 B2 | 10/2008 | Morgan et al. |
| 7,440,842 B1 | 10/2008 | Vorona |
| 7,466,235 B1 | 12/2008 | Kolb et al. |
| 7,483,944 B2 | 1/2009 | Parupudi et al. |
| 7,486,201 B2 * | 2/2009 | Kelly et al. ............. 340/905 |
| 7,500,607 B2 | 3/2009 | Williams |
| 7,512,487 B1 | 3/2009 | Golding et al. |
| 7,522,927 B2 | 4/2009 | Fitch et al. |
| 7,525,484 B2 | 4/2009 | Dupray et al. |
| 7,545,281 B2 | 6/2009 | Richards et al. |
| 7,558,696 B2 | 7/2009 | Vilppula et al. |
| 7,565,132 B2 * | 7/2009 | Ben Ayed ............. 455/404.1 |
| 7,565,157 B1 | 7/2009 | Ortega et al. |
| 7,587,345 B2 | 9/2009 | Mann et al. |
| 7,599,795 B1 | 10/2009 | Blumberg et al. |
| 7,603,233 B2 | 10/2009 | Tashiro |
| 7,606,580 B2 | 10/2009 | Granito et al. |
| 7,617,044 B2 | 11/2009 | Lee |
| 7,624,358 B2 | 11/2009 | Kim et al. |
| 7,647,174 B2 | 1/2010 | Kwon |
| 7,680,591 B2 | 3/2010 | Nagata et al. |
| 7,689,916 B1 | 3/2010 | Goel et al. |
| 7,711,478 B2 | 5/2010 | Gluck |
| 7,714,778 B2 | 5/2010 | Dupray |
| 7,743,074 B1 | 6/2010 | Parupudi et al. |
| 7,756,639 B2 | 7/2010 | Colley et al. |
| 7,768,395 B2 | 8/2010 | Gold |
| 7,811,203 B2 | 10/2010 | Unuma et al. |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,123 B2 | 2/2011 | Granito et al. |
| 7,933,612 B2 | 4/2011 | Counts et al. |
| 7,933,929 B1 | 4/2011 | McClendon et al. |
| 8,036,630 B2 | 10/2011 | Park et al. |
| 2001/0018349 A1 | 8/2001 | Kinnunen et al. |
| 2001/0046884 A1 * | 11/2001 | Yoshioka .............. 455/564 |
| 2002/0032035 A1 | 3/2002 | Teshima |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0067353 A1 | 6/2002 | Kenyon et al. |
| 2002/0077144 A1 * | 6/2002 | Keller et al. .............. 455/550 |
| 2002/0091991 A1 | 7/2002 | Castro |
| 2002/0126146 A1 | 9/2002 | Burns et al. |
| 2002/0128773 A1 | 9/2002 | Chowanic et al. |
| 2002/0132625 A1 | 9/2002 | Ogino et al. |
| 2002/0140560 A1 | 10/2002 | Altman et al. |
| 2002/0160815 A1 | 10/2002 | Patel et al. |
| 2002/0167442 A1 | 11/2002 | Taylor |
| 2002/0173905 A1 | 11/2002 | Jin et al. |
| 2003/0016804 A1 | 1/2003 | Sheha et al. |
| 2003/0032404 A1 | 2/2003 | Wager et al. |
| 2003/0055560 A1 | 3/2003 | Phillips et al. |
| 2003/0060212 A1 | 3/2003 | Thomas |
| 2003/0060215 A1 | 3/2003 | Graham |
| 2003/0060973 A1 | 3/2003 | Mathews et al. |
| 2003/0060976 A1 * | 3/2003 | Sato et al. ............ 701/209 |
| 2003/0069683 A1 | 4/2003 | Lapidot et al. |
| 2003/0078054 A1 | 4/2003 | Okuda |
| 2003/0078055 A1 * | 4/2003 | Smith et al. ............ 455/456 |
| 2003/0078057 A1 * | 4/2003 | Watanabe et al. ......... 455/456 |
| 2003/0093217 A1 | 5/2003 | Petzold et al. |
| 2003/0096620 A1 | 5/2003 | Ozturk et al. |
| 2003/0100326 A1 | 5/2003 | Grube et al. |
| 2003/0101225 A1 | 5/2003 | Han et al. |
| 2003/0134657 A1 | 7/2003 | Norta et al. |
| 2003/0144793 A1 | 7/2003 | Melaku et al. |
| 2003/0148774 A1 | 8/2003 | Naghian et al. |
| 2003/0158655 A1 | 8/2003 | Obradovich et al. |
| 2003/0236106 A1 | 12/2003 | Master et al. |
| 2004/0036649 A1 | 2/2004 | Taylor |
| 2004/0054428 A1 | 3/2004 | Sheha et al. |
| 2004/0059502 A1 * | 3/2004 | Levi et al. ............ 701/224 |
| 2004/0072577 A1 | 4/2004 | Myllymaki et al. |
| 2004/0073361 A1 | 4/2004 | Tzamaloukas et al. |
| 2004/0082351 A1 | 4/2004 | Westman |
| 2004/0083050 A1 | 4/2004 | Biyani |
| 2004/0104842 A1 | 6/2004 | Drury et al. |
| 2004/0128067 A1 | 7/2004 | Smith |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0180669 A1 | 9/2004 | Kall |
| 2004/0192299 A1 | 9/2004 | Wilson et al. |
| 2004/0198379 A1 | 10/2004 | Magee et al. |
| 2004/0198397 A1 | 10/2004 | Weiss |
| 2004/0203569 A1 * | 10/2004 | Jijina et al. .............. 455/404.1 |
| 2004/0203836 A1 | 10/2004 | Gorday et al. |
| 2004/0203880 A1 | 10/2004 | Riley |
| 2004/0203909 A1 | 10/2004 | Koster |
| 2004/0215707 A1 | 10/2004 | Fujita et al. |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260939 A1 | 12/2004 | Ichikawa et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0027442 A1 | 2/2005 | Kelley et al. |
| 2005/0033515 A1 | 2/2005 | Bozzone |
| 2005/0071078 A1 | 3/2005 | Yamada et al. |
| 2005/0075116 A1 | 4/2005 | Laird |
| 2005/0085272 A1 | 4/2005 | Anderson et al. |
| 2005/0091408 A1 | 4/2005 | Parupudi et al. |
| 2005/0096840 A1 | 5/2005 | Simske |
| 2005/0114021 A1 | 5/2005 | Krull et al. |
| 2005/0130677 A1 * | 6/2005 | Meunier et al. ............ 455/456.6 |
| 2005/0134440 A1 | 6/2005 | Breed |
| 2005/0149250 A1 | 7/2005 | Isaac |
| 2005/0153681 A1 | 7/2005 | Hanson |
| 2005/0176411 A1 | 8/2005 | Taya |
| 2005/0186954 A1 | 8/2005 | Kenney |
| 2005/0197767 A1 | 9/2005 | Nortrup |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0222763 A1 | 10/2005 | Uyeki |
| 2005/0227709 A1 | 10/2005 | Chang et al. |
| 2005/0228860 A1 | 10/2005 | Hamynen et al. |
| 2005/0234637 A1 | 10/2005 | Obradovich et al. |
| 2005/0239477 A1 | 10/2005 | Kim et al. |
| 2005/0250440 A1 | 11/2005 | Zhou et al. |
| 2005/0256639 A1 | 11/2005 | Aleksic et al. |
| 2005/0286421 A1 | 12/2005 | Janacek |
| 2006/0009908 A1 | 1/2006 | Tomita et al. |
| 2006/0015249 A1 | 1/2006 | Gieseke |
| 2006/0022048 A1 | 2/2006 | Johnson |
| 2006/0025158 A1 | 2/2006 | Leblanc et al. |
| 2006/0038719 A1 | 2/2006 | Pande et al. |
| 2006/0041377 A1 | 2/2006 | Jung et al. |

| | | | |
|---|---|---|---|
| 2006/0041378 A1 | 2/2006 | Cheng et al. | |
| 2006/0058955 A1 | 3/2006 | Mehren | |
| 2006/0063539 A1 | 3/2006 | Beyer, Jr. | |
| 2006/0069503 A1 | 3/2006 | Suomela | |
| 2006/0085392 A1 | 4/2006 | Wang et al. | |
| 2006/0094353 A1 | 5/2006 | Nielsen et al. | |
| 2006/0101005 A1 | 5/2006 | Yang et al. | |
| 2006/0111122 A1 | 5/2006 | Carlson et al. | |
| 2006/0148463 A1 | 7/2006 | Zhu et al. | |
| 2006/0150119 A1 | 7/2006 | Chesnais et al. | |
| 2006/0168300 A1 | 7/2006 | An et al. | |
| 2006/0172769 A1 | 8/2006 | Oh | |
| 2006/0172778 A1* | 8/2006 | Sundararajan et al. | 455/566 |
| 2006/0179114 A1 | 8/2006 | Deeds | |
| 2006/0180649 A1 | 8/2006 | Casey | |
| 2006/0184978 A1 | 8/2006 | Casey | |
| 2006/0195481 A1 | 8/2006 | Arrouye et al. | |
| 2006/0199567 A1 | 9/2006 | Alston | |
| 2006/0202819 A1 | 9/2006 | Adamczyk et al. | |
| 2006/0211453 A1 | 9/2006 | Schick | |
| 2006/0227047 A1 | 10/2006 | Rosenberg | |
| 2006/0229802 A1 | 10/2006 | Vertelney et al. | |
| 2006/0247855 A1 | 11/2006 | de Silva et al. | |
| 2006/0271280 A1 | 11/2006 | O'Clair | |
| 2006/0284767 A1 | 12/2006 | Taylor | |
| 2006/0287824 A1 | 12/2006 | Lin | |
| 2007/0001875 A1 | 1/2007 | Taylor | |
| 2007/0005188 A1 | 1/2007 | Johnson | |
| 2007/0005233 A1 | 1/2007 | Pinkus et al. | |
| 2007/0008515 A1 | 1/2007 | Otani et al. | |
| 2007/0010942 A1 | 1/2007 | Bill | |
| 2007/0016362 A1 | 1/2007 | Nelson | |
| 2007/0027614 A1 | 2/2007 | Reeser et al. | |
| 2007/0027628 A1 | 2/2007 | Geelen | |
| 2007/0042790 A1 | 2/2007 | Mohi et al. | |
| 2007/0055684 A1 | 3/2007 | Steven | |
| 2007/0061245 A1 | 3/2007 | Ramer et al. | |
| 2007/0061363 A1 | 3/2007 | Ramer et al. | |
| 2007/0071114 A1 | 3/2007 | Sanderford et al. | |
| 2007/0073480 A1 | 3/2007 | Singh | |
| 2007/0073719 A1 | 3/2007 | Ramer et al. | |
| 2007/0087726 A1 | 4/2007 | McGary et al. | |
| 2007/0093258 A1 | 4/2007 | Steenstra et al. | |
| 2007/0106465 A1 | 5/2007 | Adam et al. | |
| 2007/0115868 A1 | 5/2007 | Chen et al. | |
| 2007/0124043 A1 | 5/2007 | Ayoub et al. | |
| 2007/0124058 A1* | 5/2007 | Kitagawa et al. | 701/200 |
| 2007/0124066 A1 | 5/2007 | Kikuchi | |
| 2007/0127439 A1 | 6/2007 | Stein | |
| 2007/0129888 A1 | 6/2007 | Rosenberg | |
| 2007/0130153 A1 | 6/2007 | Nachman et al. | |
| 2007/0135136 A1 | 6/2007 | Ische | |
| 2007/0135990 A1 | 6/2007 | Seymour et al. | |
| 2007/0142026 A1 | 6/2007 | Kuz et al. | |
| 2007/0149212 A1 | 6/2007 | Gupta et al. | |
| 2007/0150320 A1 | 6/2007 | Huang | |
| 2007/0153983 A1 | 7/2007 | Bloebaum et al. | |
| 2007/0153984 A1 | 7/2007 | Bloebaum et al. | |
| 2007/0153986 A1 | 7/2007 | Bloebaum et al. | |
| 2007/0155360 A1* | 7/2007 | An | 455/403 |
| 2007/0156326 A1 | 7/2007 | Nesbitt | |
| 2007/0179854 A1 | 8/2007 | Ziv et al. | |
| 2007/0191029 A1 | 8/2007 | Zarem et al. | |
| 2007/0204218 A1 | 8/2007 | Weber et al. | |
| 2007/0206730 A1 | 9/2007 | Polk | |
| 2007/0208492 A1 | 9/2007 | Downs et al. | |
| 2007/0208497 A1 | 9/2007 | Downs et al. | |
| 2007/0208498 A1 | 9/2007 | Barker et al. | |
| 2007/0218925 A1 | 9/2007 | Islam et al. | |
| 2007/0219706 A1 | 9/2007 | Sheynblat | |
| 2007/0232272 A1 | 10/2007 | Gonsalves et al. | |
| 2007/0232326 A1 | 10/2007 | Johnson | |
| 2007/0233387 A1 | 10/2007 | Johnson | |
| 2007/0238491 A1* | 10/2007 | He | 455/569.2 |
| 2007/0243853 A1 | 10/2007 | Bumiller et al. | |
| 2007/0247435 A1 | 10/2007 | Benko et al. | |
| 2007/0254676 A1* | 11/2007 | Pedigo et al. | 455/456.6 |
| 2007/0259674 A1* | 11/2007 | Neef et al. | 455/456.1 |
| 2007/0260751 A1 | 11/2007 | Meesseman | |
| 2007/0266116 A1 | 11/2007 | Rensin et al. | |
| 2007/0271328 A1 | 11/2007 | Geelen et al. | |
| 2007/0276586 A1 | 11/2007 | Jeon et al. | |
| 2007/0276587 A1 | 11/2007 | Johnson | |
| 2007/0276596 A1 | 11/2007 | Solomon et al. | |
| 2007/0281664 A1 | 12/2007 | Kaneko et al. | |
| 2007/0282521 A1 | 12/2007 | Broughton | |
| 2007/0282565 A1 | 12/2007 | Bye et al. | |
| 2007/0290920 A1* | 12/2007 | Shintai et al. | 342/357.09 |
| 2007/0299601 A1 | 12/2007 | Zhao et al. | |
| 2008/0004789 A1 | 1/2008 | Horvitz et al. | |
| 2008/0004791 A1 | 1/2008 | Sera | |
| 2008/0004802 A1 | 1/2008 | Horvitz | |
| 2008/0005104 A1 | 1/2008 | Flake et al. | |
| 2008/0005301 A1 | 1/2008 | Li et al. | |
| 2008/0015422 A1 | 1/2008 | Wessel | |
| 2008/0021632 A1 | 1/2008 | Amano | |
| 2008/0024360 A1 | 1/2008 | Taylor | |
| 2008/0024364 A1 | 1/2008 | Taylor | |
| 2008/0027636 A1 | 1/2008 | Tengler et al. | |
| 2008/0030308 A1 | 2/2008 | Johnson | |
| 2008/0032703 A1 | 2/2008 | Krumm et al. | |
| 2008/0032721 A1* | 2/2008 | MacDonald et al. | 455/466 |
| 2008/0045234 A1 | 2/2008 | Reed | |
| 2008/0046176 A1 | 2/2008 | Jurgens | |
| 2008/0052407 A1 | 2/2008 | Baudino et al. | |
| 2008/0065311 A1 | 3/2008 | Bauchot et al. | |
| 2008/0070593 A1 | 3/2008 | Altman et al. | |
| 2008/0071466 A1 | 3/2008 | Downs et al. | |
| 2008/0082254 A1 | 4/2008 | Huhtala et al. | |
| 2008/0085727 A1 | 4/2008 | Kratz | |
| 2008/0086240 A1 | 4/2008 | Breed | |
| 2008/0088486 A1 | 4/2008 | Rozum et al. | |
| 2008/0091347 A1 | 4/2008 | Tashiro | |
| 2008/0096518 A1 | 4/2008 | Mock et al. | |
| 2008/0097698 A1 | 4/2008 | Arnold-Huyser et al. | |
| 2008/0098090 A1 | 4/2008 | Geraci et al. | |
| 2008/0104634 A1 | 5/2008 | Gajdos et al. | |
| 2008/0109153 A1 | 5/2008 | Gueziec | |
| 2008/0113672 A1 | 5/2008 | Karr et al. | |
| 2008/0129528 A1 | 6/2008 | Guthrie | |
| 2008/0132243 A1 | 6/2008 | Spalink et al. | |
| 2008/0132251 A1 | 6/2008 | Altman et al. | |
| 2008/0132252 A1 | 6/2008 | Altman et al. | |
| 2008/0140308 A1 | 6/2008 | Yamane et al. | |
| 2008/0140520 A1 | 6/2008 | Hyder et al. | |
| 2008/0153512 A1 | 6/2008 | Kale et al. | |
| 2008/0153513 A1 | 6/2008 | Flake et al. | |
| 2008/0155453 A1 | 6/2008 | Othmer | |
| 2008/0160956 A1 | 7/2008 | Jackson et al. | |
| 2008/0161034 A1 | 7/2008 | Akiyama | |
| 2008/0167083 A1 | 7/2008 | Wyld et al. | |
| 2008/0167796 A1 | 7/2008 | Narayanaswami | |
| 2008/0167811 A1 | 7/2008 | Geelen | |
| 2008/0172173 A1 | 7/2008 | Chang et al. | |
| 2008/0172374 A1 | 7/2008 | Wolosin et al. | |
| 2008/0176545 A1 | 7/2008 | Dicke et al. | |
| 2008/0177793 A1 | 7/2008 | Epstein et al. | |
| 2008/0189033 A1 | 8/2008 | Geelen et al. | |
| 2008/0194273 A1 | 8/2008 | Kansal et al. | |
| 2008/0200142 A1 | 8/2008 | Abdel-Kader et al. | |
| 2008/0225779 A1 | 9/2008 | Bragiel et al. | |
| 2008/0227473 A1 | 9/2008 | Haney | |
| 2008/0233919 A1 | 9/2008 | Kenney | |
| 2008/0248815 A1 | 10/2008 | Busch | |
| 2008/0249667 A1 | 10/2008 | Horvitz et al. | |
| 2008/0271072 A1 | 10/2008 | Rothschild et al. | |
| 2008/0284642 A1 | 11/2008 | Seacat et al. | |
| 2008/0287124 A1 | 11/2008 | Karabinis | |
| 2008/0288166 A1 | 11/2008 | Onishi | |
| 2008/0293397 A1 | 11/2008 | Gajdos et al. | |
| 2008/0318550 A1 | 12/2008 | DeAtley | |
| 2008/0319644 A1 | 12/2008 | Zehler | |
| 2008/0319652 A1* | 12/2008 | Moshfeghi | 701/208 |
| 2009/0003659 A1 | 1/2009 | Forstall et al. | |
| 2009/0005005 A1 | 1/2009 | Forstall et al. | |
| 2009/0005018 A1 | 1/2009 | Forstall et al. | |
| 2009/0005021 A1 | 1/2009 | Forstall et al. | |
| 2009/0005068 A1 | 1/2009 | Forstall et al. | |

| | | | |
|---|---|---|---|
| 2009/0005070 A1 | 1/2009 | Forstall et al. | |
| 2009/0005071 A1 | 1/2009 | Forstall et al. | |
| 2009/0005072 A1 | 1/2009 | Forstall et al. | |
| 2009/0005076 A1 | 1/2009 | Forstall et al. | |
| 2009/0005080 A1 | 1/2009 | Forstall et al. | |
| 2009/0005082 A1 | 1/2009 | Forstall et al. | |
| 2009/0005964 A1 | 1/2009 | Forstall et al. | |
| 2009/0005965 A1 | 1/2009 | Forstall et al. | |
| 2009/0005975 A1 | 1/2009 | Forstall et al. | |
| 2009/0005978 A1 | 1/2009 | Forstall et al. | |
| 2009/0005981 A1 | 1/2009 | Forstall et al. | |
| 2009/0006336 A1 | 1/2009 | Forstall et al. | |
| 2009/0030605 A1 | 1/2009 | Breed | |
| 2009/0031006 A1 | 1/2009 | Johnson | |
| 2009/0033540 A1 | 2/2009 | Breed et al. | |
| 2009/0042585 A1 | 2/2009 | Matsuda | |
| 2009/0089706 A1 | 4/2009 | Furches et al. | |
| 2009/0098857 A1 | 4/2009 | De Atley | |
| 2009/0121927 A1 | 5/2009 | Moshfeghi | |
| 2009/0177385 A1 | 7/2009 | Matas et al. | |
| 2009/0259573 A1 | 10/2009 | Cheng et al. | |
| 2009/0271271 A1 | 10/2009 | Johnson | |
| 2009/0281724 A1 | 11/2009 | Blumenberg et al. | |
| 2009/0286549 A1 | 11/2009 | Sazegari et al. | |
| 2010/0082820 A1 | 4/2010 | Furukawa | |
| 2010/0106397 A1 | 4/2010 | Van Essen | |
| 2010/0173647 A1 | 7/2010 | Sheynblat | |
| 2010/0207782 A1 | 8/2010 | Johnson | |
| 2011/0051658 A1 | 3/2011 | Jin et al. | |

FOREIGN PATENT DOCUMENTS

| | | | |
|---|---|---|---|
| CA | 2163215 | 5/1994 | |
| CA | 2287596 | 4/2000 | |
| CA | 2432239 | 12/2004 | |
| DE | 4437360 | 4/1996 | |
| DE | 19506890 | 8/1996 | |
| DE | 19914257 | 3/1999 | |
| DE | 10 141 695 | 3/2003 | |
| EP | 0 745 867 | 12/1996 | |
| EP | 0 763 749 | 3/1997 | |
| EP | 0 786 646 | 7/1997 | |
| EP | 785535 | 7/1997 | |
| EP | 0 809 117 | 11/1997 | |
| EP | 0 813 072 | 12/1997 | |
| EP | 0 699 330 | 4/1998 | |
| EP | 0 908 835 | 4/1999 | |
| EP | 0 997 808 | 5/2000 | |
| EP | 1 300 652 | 4/2003 | |
| EP | 1 457 928 | 9/2004 | |
| EP | 1 469 287 | 10/2004 | |
| EP | 1 496 338 | 1/2005 | |
| EP | 1 770 956 | 9/2005 | |
| EP | 1 465 041 | 2/2006 | |
| EP | 1 659 817 | 5/2006 | |
| EP | 1 790 947 | 5/2007 | |
| EP | 1 860 904 | 11/2007 | |
| FR | 2730083 | 8/1996 | |
| FR | 2272911 | 6/1999 | |
| FR | 2810183 | 12/2001 | |
| GB | 2 278 196 | 11/1994 | |
| GB | 2 322 248 | 8/1998 | |
| GB | 2 359 888 | 5/2001 | |
| GB | 2 407 230 | 4/2005 | |
| JP | 62142215 | 6/1987 | |
| JP | 05-071974 | 3/1993 | |
| JP | 06-525189 | 5/1994 | |
| JP | 2007-221433 | 5/1994 | |
| JP | 08-069436 | 3/1996 | |
| JP | 09-054895 | 2/1997 | |
| JP | 09-098474 | 4/1997 | |
| JP | 9-113288 | 5/1997 | |
| JP | 09-153125 | 6/1997 | |
| JP | 9-062993 | 7/1997 | |
| JP | 09-200850 | 7/1997 | |
| JP | 9-210710 | 8/1997 | |
| JP | 10-021259 | 1/1998 | |
| JP | 11-234736 | 8/1999 | |
| JP | 2000-163379 | 6/2000 | |
| JP | 2001-160063 | 6/2001 | |
| JP | 2002-310680 | 10/2002 | |
| JP | 10-030933 | 2/2003 | |
| JP | 2003-228532 | 8/2003 | |
| JP | 2004-045054 | 2/2004 | |
| JP | 2004-219146 | 7/2004 | |
| JP | 2004-362271 | 12/2004 | |
| JP | 2005-106741 | 4/2005 | |
| JP | 2005-182146 | 7/2005 | |
| JP | 2005-241519 | 9/2005 | |
| JP | 2006-112338 | 4/2006 | |
| JP | 2006-184007 | 7/2006 | |
| JP | 2006-270889 | 10/2006 | |
| JP | 2006-279838 | 10/2006 | |
| JP | 2007-033220 | 2/2007 | |
| JP | 2007-033331 | 2/2007 | |
| JP | 2007-033368 | 2/2007 | |
| JP | 2007-127439 | 5/2007 | |
| JP | 2007-147439 | 6/2007 | |
| JP | 2007-201699 | 8/2007 | |
| JP | 2007-240400 | 9/2007 | |
| JP | 2007-259291 | 10/2007 | |
| JP | 2007-271299 | 10/2007 | |
| JP | 2007-304009 | 11/2007 | |
| JP | 2008-058917 | 3/2008 | |
| JP | 2008-129774 | 6/2008 | |
| KR | 2004-102440 | 12/2004 | |
| KR | 2005-096746 | 10/2005 | |
| TW | 200426387 | 12/2004 | |
| WO | WO 93/20546 | 10/1993 | |
| WO | WO 97/07467 | 2/1997 | |
| WO | WO 97/24577 | 7/1997 | |
| WO | WO 97/41654 | 11/1997 | |
| WO | WO 98/03951 | 1/1998 | |
| WO | WO 98/07112 | 2/1998 | |
| WO | WO 98/54682 | 12/1998 | |
| WO | WO 99/16036 | 4/1999 | |
| WO | WO 99/44183 | 9/1999 | |
| WO | WO 99/61934 | 12/1999 | |
| WO | WO 01/31966 | 5/2001 | |
| WO | WO 01/37597 | 5/2001 | |
| WO | WO 02/054813 | 7/2002 | |
| WO | WO 03/023593 | 3/2003 | |
| WO | WO 2004/008792 | 3/2003 | |
| WO | WO 03/096055 | 11/2003 | |
| WO | WO 2004/021730 | 3/2004 | |
| WO | WO 2004/061576 | 7/2004 | |
| WO | WO 2004/076977 | 9/2004 | |
| WO | WO 2005/006258 | 1/2005 | |
| WO | WO 2006/065856 | 6/2006 | |
| WO | WO 2006/113125 | 10/2006 | |
| WO | WO 2007/052285 | 5/2007 | |
| WO | WO 2008/051929 | 5/2008 | |
| WO | WO 2008/085740 | 7/2008 | |
| WO | WO 2009/140031 | 11/2009 | |

OTHER PUBLICATIONS

U.S. Appl. No. 11/827,065, filed Jul. 10, 2007, Johnson.
U.S. Appl. No. 11/972,559, filed Jan. 10, 2008, Alten.
U.S. Appl. No. 12/044,363, filed Mar. 7, 2008, Johnson.
U.S. Appl. No. 11/114,714, filed May 2, 2008, Williamson et al.
U.S. Appl. No. 12/119,316, filed May 12, 2008, Blumenberg et al.
U.S. Appl. No. 12/122,339, filed May 16, 2008, Sazegari et al.
U.S. Appl. No. 12/233,358, filed Sep. 18, 2008, Low et al.
U.S. Appl. No. 12/270,814, filed Nov. 13, 2008, Herz.
"27 Countries in your pocket"; [online] [Retrieved on Sep. 29, 2005] Retrieved from the Internet <URL: http://www.mio-tech.be/en/printview/press-releases-2005-09-29.htm; 1 page.
"Animated Transition"; [online] [Retrieved on Oct. 16, 2006] Retrieved from the Internet <URL: http://designinterfaces.com/Animated_Transition; 2 pages.
"DaimlerCrysler Guide5 Usecases Overview Map", 1 page (no reference date).
"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.
"Mio 269+ Users Manula"; 2005; 44 pages.

"New program for mobile blogging for PocketPC released: MY BLOG"; [online] [Retrieved on Apr. 5, 2006]; Retrieved from the Internet, URL: http://msmobiles.corn/news.php/4067.html.
"Numbering and Dialing Plan within the United States", Alliance for Telecommunications Industry Solutions; 2005; 17 pages.
Review Guide—Google Maps for mobile (beta); Google; 2006; 7 pages.
"User-centered design of mobile solutions", Namahn, 2006, 18 pages.
"User's Manual MioMap 2.0"; Aug. 2005; 60 pages.
"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.
"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.
"Windows Mobile"; Microsoft; 2007, 2 pages.
Anand et al., "Quantitative Analysis of Power Consumption for Location-Aware Applications on Smart Phones", IEEE International Symposium on Industrial Electronics, 2007.
Beard et al., "Estimating Positions and Paths of Moving Objects", IEEE 2000, pp. 1-8.
Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.
Berman et al., "The Role of Dead Reckoning and Inertial Sensors in Future General Aviation Navigation", IEEE, 1998, pp. 510-517.
Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.
Binzhuo et al., "Mobile Phone GIS Based on Mobile SVG", IEEE 2005.
Bokharouss et al., "A Location-Aware Mobile Call Handling Assistant", International Conference on Advanced Information Networking and Applications Workshops, 2007.
Boonsrimuang et al., "Mobile Internet Navigation System", IEEE, 2002, pp. 325-328.
Camp et al., "A computer-based method for predicting transit time systems", Decsision Sciences, vol. 5, pp. 339-346, 1974.
Carew; "Phones that tell you where to drive, meet, eat"; [online] [Retrieved May 26, 2007]; Retrieved from the Internet <URL htt1p://news.yahoo.com/s/nm/20070525/wr_nm/column_pluggedin_dc_2&printer=1;_ylt=Ahqaftn7xm1S2r0FZFeu9G4ht.cA; 2 pages.
Cho et al., A Traveler Information Service Structure in Hybrid T-DMB and Cellular Communication Network, Broadcast Systems Research Group, IEEE, 2006, pp. 747-750.
Christie et al., "Development and Deployment of GPS wireless devices for E911 and Location based services", IEEE 2002.
Chua et al., "Intelligent Portal for Event-triggered SMS Alerts", 2nd International Conference on Mobile Technology, Applications and Systems, 2005.
Civilis et al., "Efficient Tracking of Moving Objects with Precision Guarantees", IEEE, Proceedings of the First Annual International Conference on Mobile and Ubiquitous Systems: Networking and Services, 2004, 10 pages.
Dibdin, Peter, "Where are mobile location based services?", Dec. 14, 2001, pp. 1-8.
Dunn et al., "Wireless Emergency Call System", IBM TDB, Sep. 1994.
Ebine, "Dual Frequency resonant base station antennas for PDC systems in Japan", IEEE, pp. 564-567, 1999.
Evans, "In-Vehicle Man-Machine Interaction the Socrates Approach", Vehicle Navigation & Information System Conference Proceedings, 1994, Aug. 31-Sep. 2, 1994, pp. 473-477.
FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp. 1-7 and J-1 to J-3.

*GPS 12 Personal Navigator Owner's Manual & Reference*, Garmin Corporation, Jan. 1999, pp. 1-60.
Guo et al., "An Intelligent Query System based on Chinese Short Message Service for Restaurant Recommendation", IEEE 2007, 1 page.
Hameed et al., "An Intelligent Agent-Based Medication and Emergency System", IEEE 2006.
Helal et al., "Drishti: An Integrated Navigation System for Visually Impaired and Disabled", Fifth International Symposium on Wearable Computers (ISWC'01), IEEE, 2001, pp. 149-156.
Hohman et al., "GPS Roadside Integrated Precision Positioning System", Position Location and Navigation Symposium (IEEE 2000), pp. 221-230.
International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.
Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.
Kbar et al., "Mobile Station Location based on Hybrid of Signal Strength and Time of Arrival", IEEE, 2005.
Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.
Lloyd et al., "Cellular phone base stations installation violate the Electromagnetic Compatibility regulations", IEEE, 2004.
Manabe et al., "On the M-CubITS Pedestrian Navigation System", IEEE, 2006, pp. 793-798.
Meier et al., "Location-Aware Event-Base Middleware: A Paradigm for Collaborative Mobile Applications?", Sep. 2003.
Nardi et al., "Integrating Communication and Information through Contact Map", Communications of the ACM, vol. 45, No. 4, Apr. 2002.
Oh et al., "Spatial Applications Using 4S Technology for Mobile Environment", IEEE 2002.
Paksoy et al., "The Global Position System-Navigation Tool of the Future", Journal of Electrical & Electronics, 2002, vol. 2, No. 1, pp. 467-476.
Parikh, "Tele Locate", IBM Technical Disclosure Bulletin, [online] [Retrieved Nov. 7, 2008]; Retrieved from the Internet, URL: https://www.delphion.com/tdbs/tdb?order=92A+62775; Sep. 1992; 1 page.
Partial International Search Report, dated Jul. 29, 2008, issued in corresponding PCT/US2008/050295.
Pfoser et al., "Dynamic Travel Time Maps—Enabling Efficient Navigation", Proceedings of the 18th International Conference on Scientific and Statistical Database Management (SSDBM'06), IEEE, 10 pages.
Portfolio 2007; [online] [Retrieved on Jun. 14, 2007]; Retrieved from the Internet, URL: http://eric.wahlforss.com/folio; 3 pages.
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto, J., *Augment-able Reality: Situated Communication through Physical and Digital Spaces*, iswc, pp. 68, Second International Symposium on Wearable computers (ISWC'98), 1998, pp. 1-8.
Rogers et al., "Adaptive User Interfaces for Automotive Environments", IEEE Intelligent Vehicles Symposium 2000, Oct. 3-5, 2000, pp. 662-667.
Rozier, J., *Hear & There: An Augmented Reality System of Linked Audio*, Proceedings of the International Conference on Auditory Display, Atlanta, GA, Apr. 2000, pp. 1-6.
Samadani et al., "PathMaker: Systems for Capturing Trips", IEEE (2004) International Conference on Multimedia and Expo., Publication Date: Jun. 27-30, 2004, vol. 3, pp. 2123-2126, 2004.
Schreiner, "Where We At? Mobile Phones Bring GPS to the Masses", IEEE Computers Society, May/Jun. 2007, pp. 6-11.
Sung et al., "Towards Reliable Peer-to-Peer Data Sharing over Mobile Ad hoc Networks", IEEE, 2005.

Weib et al., "Zone services—An approach for location-based data collection", Proceedings of the 8th International Conference on E-commerce Technology and the 3rd IEEE International Conference on Enterprise Computing, E-Commerce and E-Services.

Yang et al., "A Multimedia System for Route Sharing and Video-based Navigation", IEEE, 2006, pp. 73-76.

Yanyan et al., "The model of optimum route selection in vehicle automatic navigation system based on unblocked reliability analyses", IEEE 2003.

Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJ1b954T_DQn6gB; 1 page.

Feddema et al., "Cooperative Sentry Vehicles and Differential GPS Leapfrog," 2000, *United States Department of Energy*, pp. 1-12.

Maxwell et al., "Alfred: The Robot Waiter Who Remembers You," *AAAI Technical Report WS-99-15*, 1999, 12 pages.

Shibata et al., "Development and Integration of Generic Components for a Teachable Vision-Based Mobile Robot," *IEEE/ASME Transactions on Mechatronics*, 1996, 1(3):230-236.

Yogesh C. Rathod, Third Party Submission in U.S. Appl. No. 12/233,358 mailed Mar. 30, 2010, 12 pages.

Budka et al., "A Bayesian method to Improve Mobile Geolocation Accuracy", IEEE, 2002, pp. 1021-1025.

Yamamoto et al., "Position Location Technologies Using Signal Strength in Cellular Systems", IEEE, 2001, pp. 2570-2575.

International Search Report and Written Opinion, dated Oct. 1, 2009, issued in PCT/US2009/041298.

Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.

Drane et al., "The accurate location of mobile telephones", Third Annual World Congress on Intelligent Transport Systems, Orlando, Florida, Oct. 1996.

"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.

Ygnace et al., "Travel Time Estimation on the San Francisco Bay Area Network Using Cellular Phones as Probes", Working Paper, Institute of Transportation Studies, University of California, Berkeley, 2000.

Wang et al., "A Unified Vehicle Supervising and Traffic Information System", IEEE, 1996, pp. 968-972.

Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

International Search Report and Written Opinion, dated Jun. 9, 2008, issued in Interntiaonal Application No. PCT/US2007/088880, filed Dec. 27, 2007.

Spohrer. "New Paradigms for Using Computers", 1997; retrieved from the Internet, URL: <http://almaden.ibm.com/npuc97/1997/spohrer.htm>.

Yang et al. "Global Snapshots for Distributed Debugging", IEEE, pp. 436-440, 1992.

"Cyberguide: a mobile context-aware tour guide", Wireless Networks Archive (Special Issue: Mobile computing and networking; selecting papers from MobiCom '96), 3(5):421-433, 1997.

"Frontiers in electronic media", Interactions Archive 4(4):32-64, 1997.

"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.

Sharpe et al., U.S. Appl. No. 12/434,586, filed May 1, 2009.

Sharp et al., U.S. Appl. No. 12/434,582, filed May 1, 2009.

Van Os et al., U.S. Appl No. 12/165,413, filed Jun. 30, 2008.

Blumenberg et al., U.S. Appl. No. 12/119,316, filed May 12, 2008.

Low et al., U.S. Appl. No. 12/233,358, filed Sep. 18, 2008.

Sazegari et al., U.S. Appl. No. 12/122,339, filed May 16, 2008.

Johnson, U.S. Appl. No. 12/044,363, filed Mar. 7, 2008.

Johnson, U.S. Appl. No. 11/827,065, filed Jul. 10, 2007.

Herz, U.S. Appl. No. 12/270,814, filed Nov. 13, 2008.

Ju et al., "RFID Data Collection and Integration based on Mobile Agent", IEEE 2006.

Miller et al., "Synchronization of Mobile XML Databases by Utilizing Deferred Views", IEEE 2004.

Northard, "Docking Station Communication Link", IBM TDB, Feb. 1994.

Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.

Benefon ESC! GSM+GPS Personal Navigation Phone, benefon.com, Copyright 2001, 4 pages.

Freundschuh, "Does 'Anybody' Really Want (or Need) Vehicle Navigation Aids?" First Vehicle Navigation and Information System Conference, Sep. 11-13, 1989, Toronto, Canada, 5 pages.

Gould, "The Provision of Usable Navigation Assistance: Considering Individual Cognitive Ability," First Vehicle Navigation and Information System Conference, Sep. 11-13, 1989, Toronto, Canada, 7 pages.

Mark, "A Conceptual Model for Vehicle Navigation Systems," First Vehicle Navigation and Information System Conference, Sep. 11-13, 1989, Toronto, Canada 11 pages.

Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.

Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.

Hoogenraad, "Location Dependent Services," 3rd AGILE Conference on Geographic Information Science, Helsinki/Espoo, Finland, May 25-27, 2000, pp. 74-77.

Bonsignore, "A Comparative Evaluation of the Benefits of Advanced Traveler Information System (ATIS) Operational Tests," MIT Masters Thesis, Feb. 1994, 140 pages.

Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.

Burnett, "Usable Vehicle Navigation Systems: Are We There Yet?" Vehicle Electronic Systems 2000, Jun. 29-30, 2000, 3.1.1-3.1.12.

Khattak et al., "Bay Area ATIS Testbed Plan," Research Reports, California Partners for Advanced Transit and Highways (PATH), Institute of Transportation Studies, UC Berkeley, Jan. 1, 1992, 83 pages.

Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.

Mahmassani et al., "Providing Advanced and Real-Time Travel/Traffic Information to Tourists," Center for Transportation Research, Bureau of Engineering Research, The University of Texas at Austin, Oct. 1998, 15 pages.

"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.

"School Buses To Carry Noticom's First Application," Internet: URL: http://findarticles.com/p/articles/mi_m0BMD/is_1999_Feb_17/ai_n27547754/ downloaded from the Internet on Feb. 17, 1999, 2 pages.

Green et al., "Suggested Human Factors Design Guidelines for Driver Information Systems," Technical Report UMTRI-93-21, Nov. 1993, 119 pages.

Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.

Muraskin, "Two-Minute Warnings for School Bus Riders," Internet: URL: http://www.callcentermagazine.com/shared/printableArticle.jhtml ;jsessionid=PQH1SZXW...Jul. 1, 1999, 3 pages.

Ni and Deakin, "On-Board Advanced Traveler Information Systems," Dec. 1, 2002, 10 pages.

Serafin et al., "Functions and Features of Future Driver Information Systems," Technical Report UMTRI-91-16, May 1991, 104 pages.

Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.

"LaBarge in joint venture on bus system," Internet: URL: http://www.bizjournals.com/stlouis/stories/1998/08/10/focus2.html?t-printable, Aug. 7, 1998, 1 page.

Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.

Brown, "The stick-e document: a framework for creating context-aware applications," Electronic Publishing, 1995, 8:259-272.

Brown, "Triggering Information by Context," Personal Technologies, 1998, 2:18-27.

Dey et al., "CyberDesk: a framework for providing self-integrating context-aware services," Knowledge-Based Systems, 1998, 11:3-13.

Hodes and Katz, "Composable ad hoc location-based services for heterogeneous mobile clients," Wireless Networks, 1999, 5:411-427.

Kreller et al., "A Mobile-Aware City Guide Application," ACTS Mobile Communication Summit, 1998, Rhodes, Greece, 7 pages.

Lusky et al., "Mapping the Present," ColoradoBiz, Nov. 1999, 26(11):16-17.

McCarthy and Meidel, "ACTIVEMAP: A Visualization Tool for Location Awareness to Support Informal Interactions," HUC '99, LNCS 1707, 1999, pp. 158-170.

O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.

Pascoe et al., "Developing Personal Technology for the Field," Personal Technologies, 1998, 2:28-36.

Tarumi et al., "Public Applications of SpaceTag and Their Impacts," Digital Cities, LNCS 1765, 2000, pp. 350-363.

Tebbutt, "Dial your way out of the woods," The Australian, Feb. 2000, 1 page.

Tso et al., "Always On, Always Connected Mobile Computing," Mobile Communications Operation—Mobile Handheld Products Group, 1996, pp. 918-924.

Wang and Lin, "Location Aware Information Agent over WAP," Tamkang Journal of Science and Engineering, 2000, 3(2):107-115.

"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.

"Report on Location Service feature (LCS) 25.923 v1.0.0," TSG-RAN Working Group 2 (Radio layer 2 and Radio layer 3), Berlin, May 25-28, 1999, 45 pages.

"3rd Generation Partnership Project; Technical Specification Group Services and System Aspects; Functional stage 2 description of location services in UMTS," 3G TS 23.171 v.1.1.0, Nov. 1999, 42 pages.

"3rd Generation Partnership Project; Technical Specification Group Radio Access Network; Stage 2 Functional Specification of Location Services in UTRAN," 3G TS 25.305 v.3.1.0, Mar. 2000, 45 pages.

"Enabling UMTS / Third Generation Services and Applications," No. 11 Report from the UMTS Forum, Oct. 2000, 72 pages.

"Revised CR to 09/31 on work item LCS," ETSI SMG3 Plenary Meeting #6, Nice, France, Dec. 13-15, 1999. 18 pages.

Digital cellular telecommunications system (Phase 2+); Location Services (LCS); Service description, Stage 1 (GSM 02.71) ETSI, Apr. 1999, 22 pages.

Akerblom, "Tracking Mobile Phones in Urban Areas," Goteborg University Thesis, Sep. 2000, 67 pages.

Borsodi, "Super Resolution of Discrete Arrivals in a Cellular Geolocation System," University of Calgary Thesis, Apr. 2000, 164 pages.

Abowd et al., "Context-awareness in wearable and ubiquitous computing," 1st International Symposium on Wearable Computers, Oct. 13-14, 1997, Cambridge, MA, 9 pages.

Balsiger et al., "MOGID: Mobile Geo-depended Information on Demand," Workshop on Position Dependent Information Services (W3C-WAP), 2000, 8 pages.

Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.

Cheverst et al., "The Role of Connectivity in Supporting Context-Sensitive Applications," HUC'99, LNCS 1707, 1999, pp. 193-209.

Efstratiou and Cheverst, "Reflection: A Solution for Highly Adaptive Mobile Systems," 2000 Workshop on Reflective Middleware, 2000, 2 pages.

Cheverst et al., "The Support of Mobile-Awareness in Collaborative Groupware," Personal Technologies, 1999, 3:33-42.

Cheverst et al., "Design of an Object Model for a Context Sensitive Tourist Guide," Computers and Graphics, 1999, 23(6):883-891.

Cheverst et al., "Developing Interfaces for Collaborative Mobile Systems," 1999, 15 pages.

Cheverst et al., "Experiences of Developing and Deploying a Context-Aware Tourist Guide: The Guide Project," 2000, pp. 20-31.

Cheverst et al., "Exploiting Context to Support Social Awareness and Social Navigation," SIGGROUP Bulleting Dec. 2000, 21(3):43-48.

Cheverst et al., "Services to Support Consistency in Mobile Collaborative Applications," Proc. 3rd International Workshop on Services in Distributed Networked Environments, 1996, 8 pages.

Cheverst et al., "Sharing (Location) Context to Facilitate Collaboration Between City Visitors," 2000, 8 pages.

Cheverst et al., "Supporting Collaboration in Mobile-aware Groupware," Workshop on Handheld CSCW, 1998, 6 pages.

Change Request for "U.S. specific Emergency Services requirements included as an informative annex," Nov. 29, 1999, 2 pages.

International Preliminary Report on Patentability in PCT/US2009/055065 mailed Mar. 31, 2011, 8 pages.

Costa et al., "Experiments with Reflective Middleware," Proceedings of the ECOOP'98 Workshop on Reflective Object-Oriented Programming and Systems, ECOOP'98 Workshop Reader, 1998, 13 pages.

Davies et al., "L2imbo: A distributed systems plastform for mobile computing," Mobile Networks and Applications, 1998, 3:143-156.

Davies eet al., "'Caches in the Air': Disseminating Tourist Information in the Guide System," Second IEEE Workshop on Mobile Computer Systems and Applications, Feb. 25-26, 1999, 9 pages.

Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.

Drane et al., "Positioning GSM Telephones," IEEE Communications Magazine, Apr. 1998, pp. 46-59.

Drane and Rizos, "Role of Positioning Systems in ITS," Positioning Systems in Intelligent Transportation Systems, Dec. 1997, pp. 312, 346-349.

Efstratiou et al., "Architectural Requirements for the Effective Support of Adaptive Mobile Applications," 2000, 12 pages.

"Estonian operator to launch world's first Network-based location services," Ericsson Press Release, Oct. 11, 1999, 2 pages.

Fischer et al., "System Performance Evaluation of Mobile Positioning Methods," IEEE, Aug. 2002, pp. 1962-1966.
Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.
French and Driscoll, "Location Technologies for ITS Emergency Notification and E911," Proc. 1996 National Technical Meeting of The Institute of Navigation, Jan. 22-24, 1996, pp. 355-359.
Friday et al., "Developing Adaptive Applications: The MOST Experience," J. Integrated Computer-Aided Engineering, 1999, pp. 143-157.
Gunnarsson et al., "Location Trial System for Mobile Phones," IEEE, 1998, pp. 2211-2216.
Jose and Davies, "Scalabe and Flexible Location-Based Services for Ubiquitous Information Access," HUC'99, LNCS 1707, 1999, pp. 52-66.
Klinec and Nolz, "Nexus-Positioning and Communication Environment for Spatially Aware Applications," IAPRS, Amsterdam, 2000, 7 pages.
Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.
Kreller et al., "UMTS: A Middleware Architecture and Mobile API/Approach," IEEE Personal Communications, Apr. 1998, pp. 32-38.
Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.
Kyriazakos et al., "Optimization of the Handover Algorithm based on the Position of the Mobile Terminals," Communications and Vehicular Technology, Oct. 2000, pp. 155-159.
Leonhardt and Magee, "Multi-Sensor Location Tracking," MOBICOM 98, Dallas, TX, pp. 203-214.
Leonhardt and Magee, "Towards a general location service for mobile environments," Proc. Third International Workshop on Services in Distributed and Networked Environments, Jun. 3-4, 1996, 8 pages.
Long et al., "Rapid Prototyping of Mobile Context-Aware Applications: The Cyberguide Case Study," MobiCom '96, 1996, 11 pages.
Yokote, "The Apertos Reflective Operating System: The Concept and Its Implementation," OOPSLA'92, pp. 414-434.
Popescu-Zeletin et al., "Applying Location-Aware Computing for Electronic Commerce: Mobile Guide," Proc. 5th Conference on Computer Communications, AFRICOM-CCDC'98,Oct. 20-22, 1998, 14 pages.
Zhao, "Mobile Phone Location Determination and Its Impact on Intelligent Transportation Systems," IEEE Transactions on Intelligent Transportation Systems, Mar. 2000, 1(1):55-64.
Microsoft Outlook 2003 User's Guide, http://opan.admin.ufl.edu/user_guides/outlook2003.htm. Aug. 2004, 17 pages.
"Error: could not find a contact with this e-mail address." Outlookbanter.com. Dec. 2006, 12 pages.
US 6,731,928, 05/2004, Tanaka (withdrawn)

* cited by examiner

SYNCHRONIZING MOBILE AND VEHICLE DEVICES

RELATED APPLICATION

This application claims a benefit of priority from U.S. Provisional Patent Application No. 60/946,792, titled "Synchronizing Mobile and Vehicle Devices," filed Jun. 28, 2007, which is incorporated by reference herein in its entirety.

FIELD OF THE INVENTION

The present invention relates generally to mobile devices.

BACKGROUND

The role of traditional printed maps is being supplanted by modern devices capable of rendering dynamic map displays. Devices that include mapping or navigation applications provide information regarding an area selected by a user by recalling map data from local memory or networked services.

Mapping devices include appropriately configured personal computers as well as dedicated mobile devices, including those found in automobiles, aircraft, and watercraft. Newer mobile devices may integrate mapping features with one or more other functions previously found only in stand alone devices, such as computing functions, personal data assistants, cellular telephone service, network access, camera functions, and the ability to play media files and games.

Mapping devices often include the ability to provide directions from a point of origin to a destination. When coupled with any of a number of positioning technologies, a mapping device can display a current position on a map as well as deliver navigation instructions based on the current position to route a user to a desired destination. Positioning technologies include satellite positioning systems such as GPS, information from nearby cellular base stations, information from other mapping devices, and information from other transmitters, such as IEEE 802.x or Bluetooth™ transmitters, having known locations.

SUMMARY

According to one aspect, there is disclosed a computer-implemented method. The method includes receiving, at a mobile device, location information stored in a memory of a vehicle device, and updating a mobile device based on the location information, where the mobile device is proximate to the location of the vehicle device. The method also includes receiving sensor data from at least one sensor measuring movement of the mobile device, and calculating an estimated location of the mobile device based at least in part on the location information and the sensor data.

One or more of the following features may also be included. The vehicle device can include a GPS system and/or a GPS receiver. The at least one sensor can be located within the mobile device, and can be an accelerometer, gyro, and/or compass. Additionally, the mobile device can be in communication with the vehicle device during the updating of the mobile device. The mobile device can be in communication with the vehicle device via a wireless communication and/or via a communication link. Additionally, the location information can include the current location of the vehicle device, the location of a desired destination, the location of an object, or navigation information.

According to another aspect, there is disclosed a computer-implemented method. The method includes transmitting to a vehicle device location information stored in a memory of a mobile device, and updating the vehicle device based on the location information, where the mobile device is proximate to the location of the vehicle device, and where the location information is accessible to a user via at least one interface with the vehicle device.

One or more of the following features may also be included. The vehicle device can include a GPS system and/or a GPS receiver. The method can also include comparing the location information to vehicle device data prior to updating the vehicle device based on the location information. Furthermore, updating the vehicle device based on the location information may occur after a determination that the location information does not exist in the vehicle device data. The mobile device can be in communication with the vehicle device via a wireless communication and/or via a communication link. Additionally, the location information can include the identity of an object, the identity of a geographical location, the geographical location of a desired destination, the geographical location of an object, or navigation information.

According to yet another aspect, there is disclosed a computer-implemented method that includes transmitting to a vehicle device contact information stored in a memory of a mobile device, and updating the vehicle device based on the contact information, where the mobile device is proximate to the location of the vehicle device, and where the contact information is accessible to a user via at least one interface with the vehicle device.

According to a feature, the contact information can include a telephone number, an address, a name, and/or an email address.

According to another aspect, there is disclosed a portable electronic device. The device includes a touch sensitive display, one or more processors, a memory, a motion sensor, and a program. The program is stored in the memory and configured to be executed by the one or more processors, and the program includes instructions for calculating an estimated current location of the device, the calculation being based at least in part on location information provided by a vehicle device and received sensor data from at least one sensor of the portable electronic device.

According to yet another aspect, there is disclosed a method of coupling a first device to a second device, where the first device is proximate to the second device, updating the first device with location information from the second device, and calculating an estimated location of the first device based at least in part on the location information from the second device. The second device can also be updated with location information received from the first device.

BRIEF DESCRIPTION OF THE DRAWINGS

Like reference numerals refer to corresponding parts throughout the drawings.

DETAILED DESCRIPTION

Figure 1:
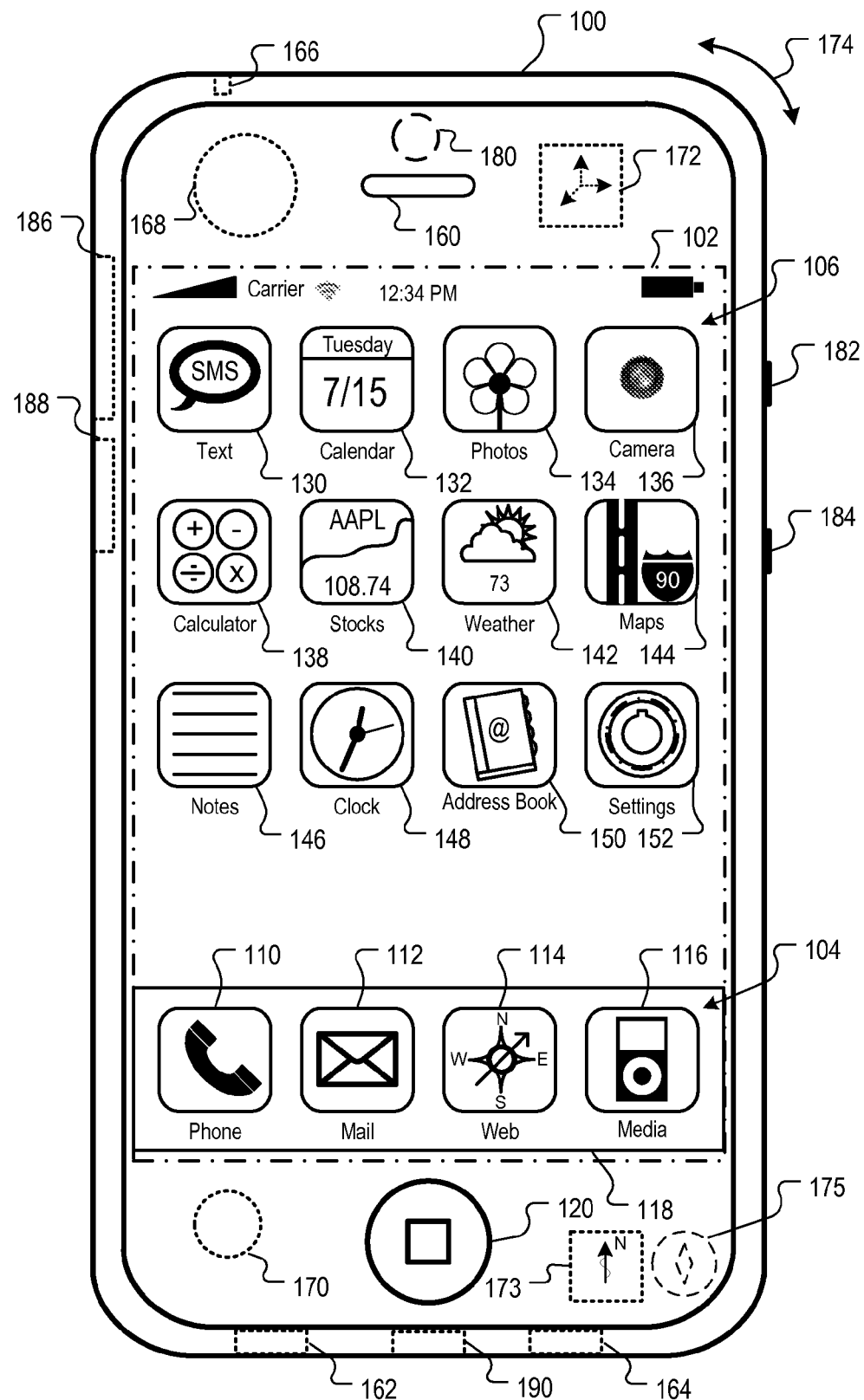
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, one or more of an accelerometer 172, a compass 173, and a gyroscope 175 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, GPS systems and/or receivers, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
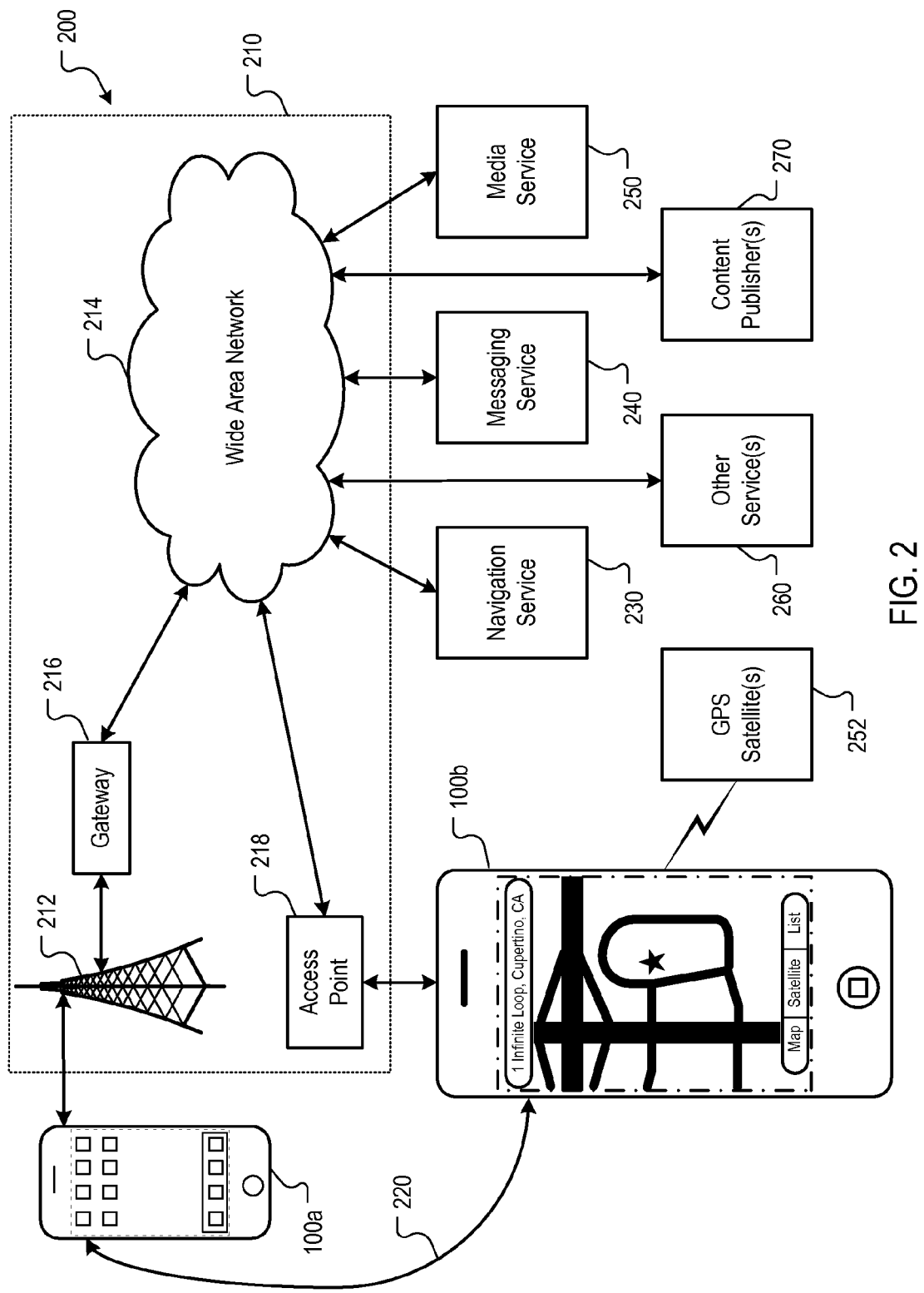
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access device, can provide communication access to the wide area network 214. In some implementations, both voice and data communications can be established over the wireless network 212 and the access device 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access device 218 and the wide area network 214. In some implementations, the mobile device 100 can be physically connected to the access device 218 using one or more cables and the access device 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

The mobile device 100 can also communicate with one or more GPS Satellite(s) 252 to enable circuitry and sensors (e.g., a GPS receiver on the mobile device 100) to support a location determining capability.

Example Mobile Device Architecture

Figure 3:
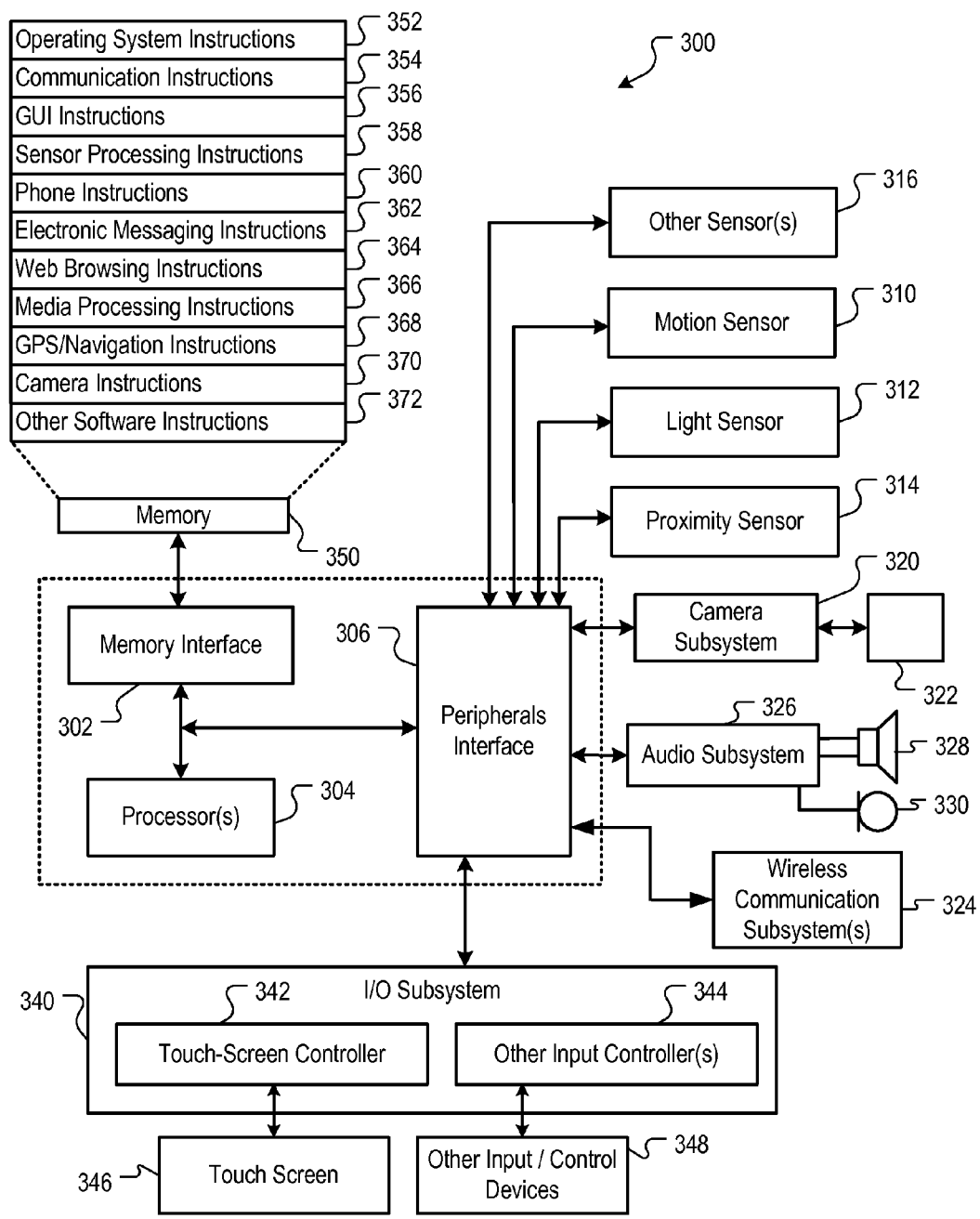
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to one or more speakers 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system, such as Darwin, RTXC, LINUX, UNIX, OS X, WINDOWS, or an embedded operating system such as VxWorks. The operating system may include instructions 352 for handling basic system services and for performing hardware dependent tasks. In some implementations, the operating system can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other related processes and functions (e.g., security processes, activation record).

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Integrated Map/Address Book Feature

In one implementation, the mobile device 100 is location aware (i.e., can determine its current location). The user of the mobile device 100 can select the map display object 144 to invoke a map application. The map application provides a display of a map on a display (e.g., the touch sensitive display 102), where the map is approximately centered, for example, about the current location of the mobile device 100. By way of example, the map application can be Google Maps API provided by Google, Inc. of Mountain View, Calif., although other map applications can be used.

The user of the mobile device can select the address book display object 150 to invoke an address book application. The address book includes information corresponding to a set of contacts selected by the user. For example, the contact information can include a person or entity's name, address, phone number, e-mail address, and/or other information related to the person or entity. The address book can be stored within the mobile device 100, or stored externally and accessible by the mobile device 100.

Referring again to FIG. 3, in this implementation, the mobile device 100 includes a positioning system 318. In various implementations, the positioning system 318 can be provided by a separate device coupled to the mobile device 100, or can be provided internal to the mobile device. In some implementations, the positioning system 318 can employ positioning technology including a GPS, a cellular grid, URIs or any other technology for determining the geographic location of a device. In some implementations, the positioning system 318 can employ a service provided by a positioning service such as, for example, SkyHook Wireless of Boston, Mass., or Rosum Corporation of Mountain View, Calif. In other implementations, the positioning system 318 can be provided by an accelerometer and a compass using dead reckoning techniques. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system 318 can be provided by using wireless signal strength and one or more locations of known wireless signal sources to provide the current location. Wireless signal sources can include access points and/or cellular towers. Other techniques to determine a current location of the mobile device 100 can be used and other configurations of the positioning system 318 are possible.

In this implementation, an integrated map/address book feature is provided. By integrating the map application and the address book application provided by the mobile device 100, graphical objects can be displayed on the map representing locations of contacts included in the user's address book. In some implementations, each time a user selects to activate the map application, the user is asked whether or not the user would like to activate the integrated map/address book feature, to which the user can respond yes to activate the feature or no to use the map application independent of the address book application. In other implementations, the user can set a default as to whether the integrated map/address book feature is always on or always off within settings included in the mobile device 100. In yet other implementations, a graphical display object can be provided to specifically activate the map application integrated with the address book application.

By employing the integrated map/address book feature, advantageously, the user is presented with immediate information about persons or entities known to the user that are within a predetermined vicinity to the current location of the mobile device 100. For example, if the user traveled to a city on vacation or for business, rather than manually scanning through the user's address book to determined which contacts were located in the city, and their relative locations to one another and to a destination of the user, the user can employ the integrated map/address book feature while present in a location in the city and be provided an immediate visual presentation of this information.

In another implementation, the user can request a map of a location other than the current location of the mobile device, and employ the integrated map/address book feature in relation to the user-specified location. That is, for example, prior to the user traveling to a city on vacation or for business, the user can input the address where he/she will be staying in the city, and employ the feature to be provided an immediate visual depiction of contact locations from the user's address book, within a predefined proximity to the user-specified location.

Example GPS and Dead-Reckoning Navigation Functionality

According to an implementation, the location of the mobile device 100 can be measured using information received from orbiting GPS satellites using a GPS receiver. The present latitude and longitude of the mobile device can be determined and shown on the display 102 with a map of the surrounding area. For example, selection of the map object 144 can present a user with a map showing the user's current location and a menu of options for manipulating the map using navigation features of the device 100.

In an implementation, the location of the device 100 can be measured based on the timing of signals to or from nearby cellular base stations. In an implementation, if the location of one or more IEEE 802.x or Bluetooth™ transmitters is known, reception of signals from these transmitters by the device 100 can be used to measure the device's current location. In another implementation, past locations of the device 100 are stored in memory 350 so that a location history or a traveled path can be displayed.

In some situations environmental factors can prevent the location of the device 100 from being determined. For example, GPS reception is often not possible unless a line of sight can be established between the GPS receiver and the number of satellites needed to compute the receiver's location. In addition, determining position using terrestrial radio waves might not be possible near sources of radio frequency interference or in areas where multiple time delayed versions of a transmission are created due to reflections off surrounding structures.

In an implementation, the device 100 includes one or more of: an accelerometer 172, a magnetic compass 173, and a gyro 175. The accelerometer 172, compass 173, and gyro 175 can be used alone or in combination to measure movements of the device 100. Additional sensors can be located external to the device 100, for example, on the person of the user. For example, any, some, or all of an accelerometer, a compass, a gyro, and an impact sensor can be located on or in the user's footwear. An impact sensor detects footwear contact with the ground, facilitating the measurement of a number of steps. A distance traveled can be estimated using the product of the average length of a user's stride and a number of steps taken. Alternatively contact with the ground during walking can be measured using an accelerometer that detects the change in velocity of a shoe as it contacts the ground. The sensors can be located on or in one or both of the user's shoes. The external sensors can send information to the device 100 via a wireless link. The length of the user's stride can be set and stored in device memory.

Information from accelerometers, a compass, gyros, and impact sensors can be used alone or in combination to, for example, measure the movement of the device 100 from a point of origin or known location (a "fix") to determine the device's location relative to the fix. Location measurement techniques of this type are generally referred to as "dead reckoning". Dead reckoning can be used in conjunction with other location measurement techniques such as GPS, and used in cases where no satellite or terrestrial positioning signal information is available (whether the unavailability is due to interference in the operating environment or the lack or reception capabilities in the device).

Dead reckoning position measurement is error prone, and small errors in measuring a turn, for example, can lead to large errors later if a new fix is not obtained before a lengthy distance is traversed. Frequently updated fixes improve the accuracy of a location shown, for example, on a moving map display of the mobile device 100 measured using dead reckoning. In an implementation, the device 100 is configured to switch into a dead reckoning positioning mode upon another positioning mode becoming unavailable.

Example Communication with Vehicle Device(s)

Figure 4:
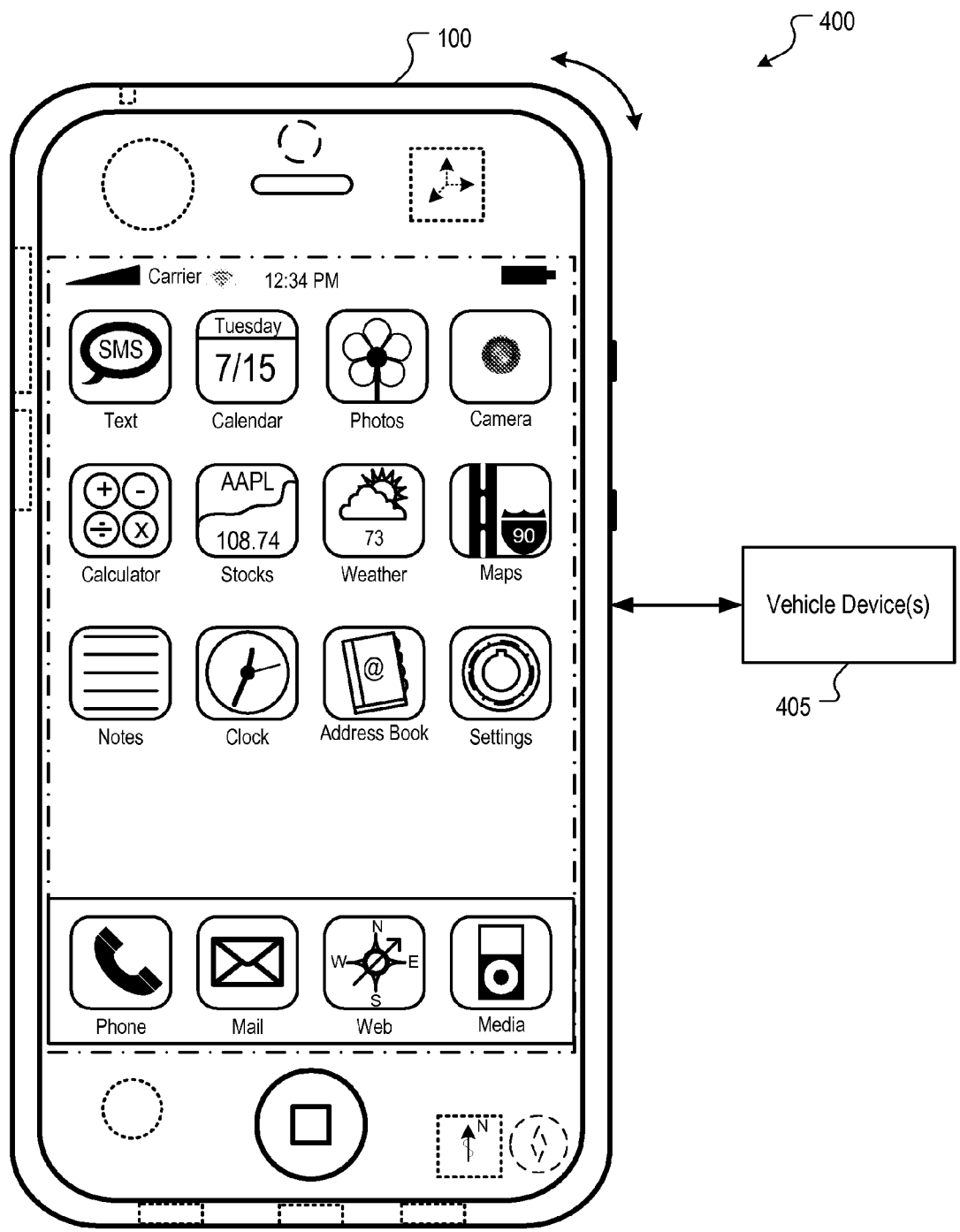
FIG. 4 is an example system including an example implementation of the mobile device of FIG. 1.

FIG. 4 is a block diagram of an example system 400 including an example implementation of the mobile device 100 of FIG. 1. In an implementation, the mobile device 100 includes an integrated GPS receiver. Alternatively, or in addition, the mobile device 100 can accept a GPS receiver as an accessory.

The example system 400 includes one or more vehicle devices 405 in communication with the mobile device 100. According to an implementation, the vehicle device(s) 405 can be removably connected to the mobile device 100 via the other input/control devices 348. The vehicle device(s) 405 can include a GPS system and/or GPS receiver illustrated in FIG. 4 as external to the mobile device 100. As an example, the one or more vehicle device(s) 405 can be a GPS system located within an automobile, which the mobile device 100 may communicate with via a connection (e.g., a removable connection, a wired connection or wireless connection) via the other input/control devices 348. Communication with the vehicle device(s), which in some implementations may operate as an accessory GPS receiver, can occur via a wired connection such as a USB connection, a compact flash interface, secure digital interface, or other wired connection types.

According to an implementation, the vehicle device(s) 405 can communicate with the mobile device 100 via the wireless communication subsystem(s) 324. For example, the vehicle device(s) 405 can communicate with the mobile device 100 via a wireless connection such as IEEE 802.x, Bluetooth™, or other wireless communication formats.

According to an implementation, the device 100 is configured to communicate with the vehicle device(s) 405 to receive location information from the vehicle device(s) 405. Location information can include a current location of the vehicle device(s), the location of a desired destination, the location or identity of an object, navigation information (including routes), address information, configuration settings, historical route information, traffic information, and the like.

According to an implementation, the mobile device 100 can use the location information to identify the current location of the mobile device 100 even where the mobile device 100 is unable to identify its current location, for example, due to failure of the device 100 to include a GPS receiver or other means for identifying its location, or failure of the device 100 to acquire GPS signals or other location signals from IEEE 802.x, Bluetooth™ transmitters, and the like. Additionally or alternatively, the mobile device 100 can use location information provided by the vehicle device(s) 405 instead of the location of the mobile device 100 as measured, for instance, using a GPS receiver in the device 100.

According to an implementation, location information is repeatedly provided to the mobile device 100 in real-time or near real-time by the vehicle device(s) 405. The information may be retrieved from the vehicle device(s) 405 via a data retrieval request (i.e., a 'pull procedure') or may be transmitted to the mobile device 100 by the vehicle device(s) 405 automatically (i.e., a 'push procedure'). According to an implementation, the location of the mobile device 100 identified by the vehicle device(s) 405, including the present latitude and longitude of the mobile device 100, can be shown on the display 102 with a map of the surrounding area. For example, selection of the map object 144 can present a user with a map showing the current location of the mobile device 100 and a menu of options for manipulating the map using navigation features of the device 100. The location of the vehicle device(s) 405 provided to the mobile device 100 provides an accurate estimate for the location of the mobile device 100 because the mobile device 100 is typically proximate to the vehicle device(s) 405. For instance, the mobile device 100 may be docked and communicate with a GPS system inside of an automobile.

According to an implementation, location information may be received from the vehicle device(s) 405 and stored in the mobile device 100 for use by a user when the mobile device 100 is no longer in communication with the vehicle device(s) 405. For instance, location information received from the vehicle device(s) 405 may be used for street navigation by a user. For example, even where the mobile device 100 does not include a GPS receiver (or GPS signals are unavailable), the mobile device 100 can use the last known location, as provided by the location information provided by the vehicle device(s) 405, as a starting point for dead-reckoning navigation, which can use dead reckoning position measurements to estimate a current location of the device 100 as the device moves. In an implementation, the device 100 can be automatically configured to switch into a dead reckoning positioning mode when undocked from (i.e., no longer in communication with) a vehicle device(s) 405 if the device does not include a GPS receiver (or GPS signals are unavailable). According to another example, a user can utilize location information, such as the location of a desired destination or sites of interest, provided to the mobile device 100 from the vehicle device(s) 405 after departing a vehicle.

According to an implementation, the vehicle device(s) 405 can store and/or identify information in addition to (or alternatively to) location information. For instance, the vehicle device(s) 405 can include vehicle navigation systems, vehicle audio systems, telecommunication systems or interfaces, vehicle computers, and the like. The device 100 can be configured to receive any information identified and/or stored by vehicle device(s) 405. For instance, vehicle diagnostics (e.g., fluid levels, maintenance schedules, problems, etc.), music or other media files, contact information, and the like, may be transmitted from the vehicle device(s) 405 to the mobile device 100. Other information that may be provided to the device 100 from the vehicle device(s) can include vehicle data including energy consumption, average miles per gallon, time of use, average speed, high speed, percentage of time running on an electric power source, route information, maintenance schedules, and the like. According to an implementation, one or more other software instructions 372 can include instructions for interfacing with one or more vehicle device(s) 405. According to an implementation, the one or more other software instructions 372 can include vehicle diagnostic algorithms to retrieve vehicle diagnostics for storing in the mobile device 100.

According to another implementation, the mobile device 100 is operable to update the vehicle device(s) with any information identified and/or stored by the device 100. For instance, the mobile device 100 can update the vehicle device(s) with location information, including its current location, the location of a desired destination, the location or identity of an object, navigation information (including routes), address information, configuration settings, historical route information, traffic information, other information corresponding to points of interest, and the like. For example, using the mobile device 100 a user may identify a particular destination, such as a store or restaurant, and save that destination (e.g., the identity of the destination) using one or more interfaces of the mobile device 100. When the device 100 is in communication with the vehicle device(s) 405 the device 100 can update the vehicle device(s) 405 with the information. The vehicle device(s) 405 can then use the information to provide instructions (e.g., driving directions) to a user to reach the desired destination.

The mobile device 100 may store map information and provide the map information to the vehicle device(s). In some implementations this may occur via updating of one or more vehicle device databases. For instance, the mobile device 100 may be used to provide a vehicle GPS system or device with updated map information. This can include, for instance, updates to road locations, location of objects, telephone numbers, object names, and other information typically used by GPS systems. According to another implementation, contact information stored in the device 100 can be communicated to vehicle device(s). Contact information can include one or more telephone numbers, addresses, names, email addresses, and the like. For instance, a vehicle telecommunication system could use contact information provided by the mobile device 100 to populate address book entries which a user can reference or use to place a call. The mobile device can provide other data to vehicle device(s), including vehicle software updates.

Figure 5:
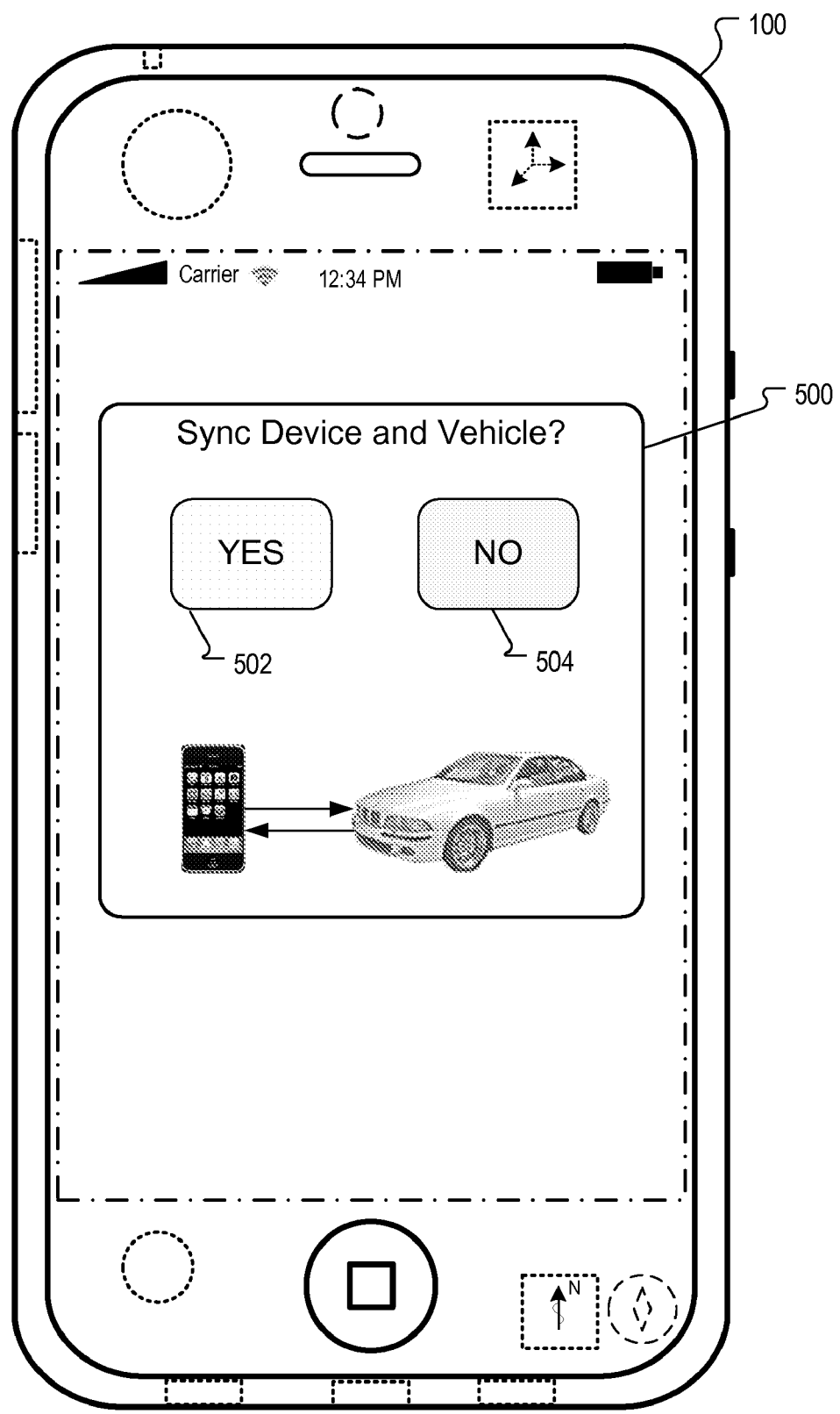
FIG. 5 is an example synchronization request screen of the mobile device of FIG. 1.

FIG. 5 is a block diagram of an example synchronization request screen 500 of the mobile device of FIG. 1. In an implementation, the request screen 500 can appear after the mobile device 100 is in communication with the vehicle device(s) 405. This can occur after the mobile device 100 is docked or physically connected to the vehicle device(s) 405, or after wireless communication between the two devices is established.

The synchronization request screen 500 includes two user selectable touch-sensitive display buttons 502, 504 that permit a user to accept or deny synchronization between the mobile device 100 and vehicle device(s) 405. If the user accepts synchronization, the mobile device 100 and vehicle device(s) 405 are synchronized according to synchronization settings established by the user using the synchronization settings screen described with respect to FIG. 6, below. If the user does not accept synchronization, the mobile device 100 and vehicle device(s) 405 will not communicate with each other. According to an implementation, the user may not be prompted to accept or deny synchronization. According to an implementation, the user may configure whether synchronization will occur automatically without user input.

Figure 6:
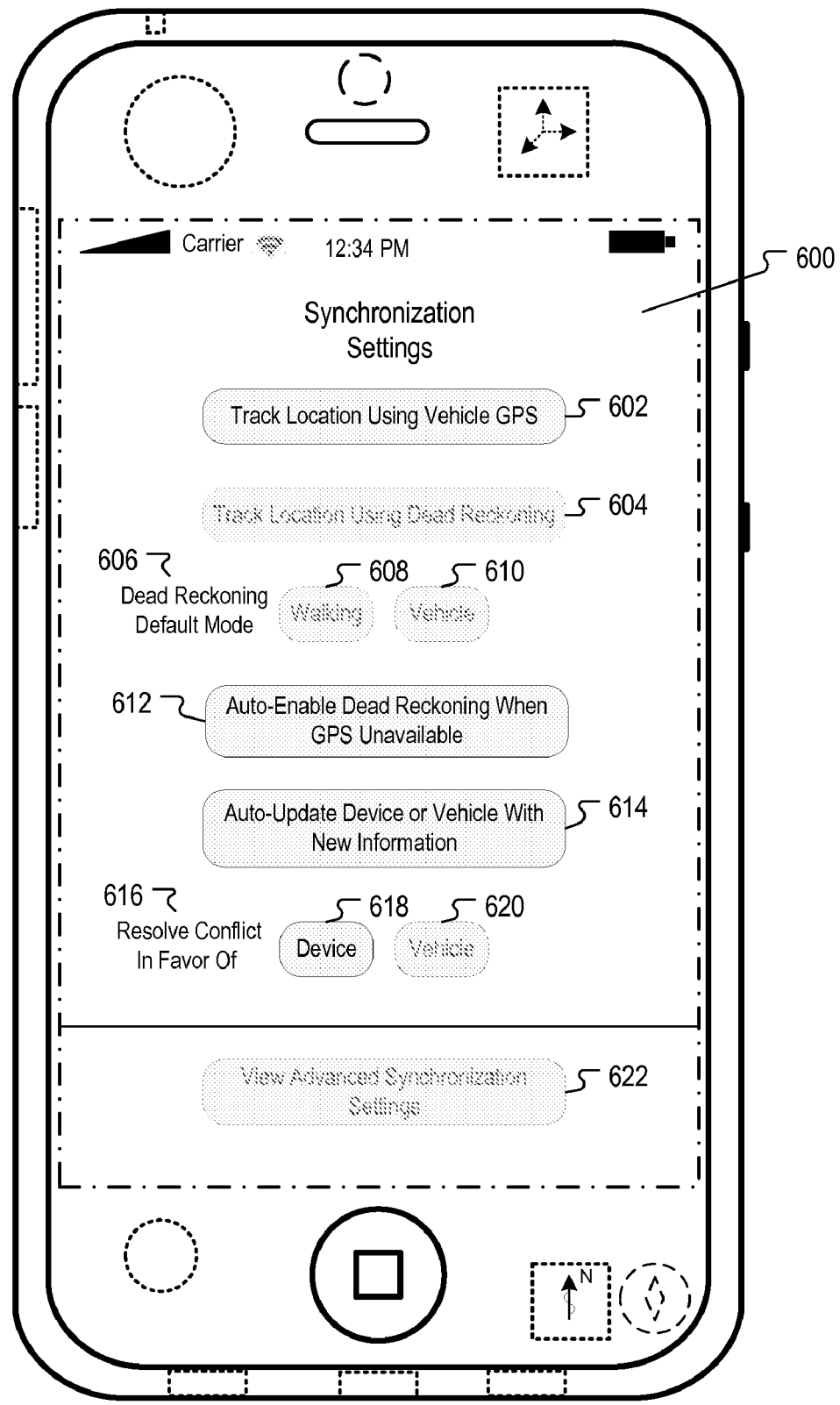
FIG. 6 is an example synchronization settings screen of the mobile device of FIG. 1.

FIG. 6 is a block diagram of an example synchronization settings screen 600 of the mobile device of FIG. 1. The screen 600 includes user selectable touch-sensitive display buttons 602, 604, 606, 608, 610, 612, 614, 616, 618, 620, 622 that allow a user to toggle synchronization settings on or off. Touching the button toggles the buttons between an active or enabled state, and a disabled state. When a button is in a disabled state its appearance changes to a lighter or "grayed out" appearance.

The "track location using vehicle GPS" button 602 is shown in an enabled state. In an implementation, enabling this function causes the mobile device 100 to receive location information from the vehicle device(s) 405. This button will appear as "grayed out" and unavailable for a user selection is location information is inaccessible from the vehicle device(s) 405. When the "track location using vehicle GPS" button 602 is selected, the "track location using dead-reckoning" button 604, "walking" button 608, and "vehicle" button 610 toggle to a disabled state. Selection of the "track location using dead-reckoning" button 604 causes the "track location using vehicle GPS" to toggle to a disabled state, and causes the device to use dead-reckoning to identify the current location of the device 100. Dead-reckoning uses the last known location of the device as a starting point for estimating a location of the device 100.

A dead-reckoning default mode selection 606 is shown. The "vehicle mode" button 610 and "walking mode" button 608 are accessible when the "track location using dead-reckoning" button 604 is enabled. Both are shown in disabled states. When the "track location using dead-reckoning" button 604 is enabled, a touch of the "walking mode" button 608 would cause a walking mode to become enabled, which, in turn, causes the "vehicle mode" button 610 to toggle to the disabled representation. When the "track location using dead-reckoning" button 604 is enabled, a touch of the "vehicle mode" button 610 would cause a vehicle mode to become enabled, which, in turn, causes the "walking mode" button 608 to toggle to the disabled representation.

In an implementation, a vehicle dead reckoning mode uses an accelerometer reading to determine how the device is positioned relative to the earth's gravity. That is, the accelerometer is used to detect which direction is down relative to the positioning of the device. This axis changes and measurements are updated if the device is reoriented in the vehicle. In the vehicle mode, sudden accelerations in a positive or negative direction along the axis of the earth's gravity are given a reduced importance in the dead reckoning position measurement calculation being utilized. Accelerations along this axis are discounted as they are likely caused by undulations of a traveling surface and reactions thereto by a vehicle suspension system. Accelerations along the axes perpendicular to the detected gravity axis are given enhanced weight in the vehicle mode as it is primarily these accelerations, that contribute to displacement of the vehicle from a known fix to a second position to be measured via dead reckoning and displayed on a map. In an implementation, accelerations along the axes perpendicular to the axis of gravity are compared with rotations detected by the gyroscope 175 to determine a change of direction. In an implementation, accelerations along the axes perpendicular to the axis of gravity are compared with rotations detected by the magnetic compass 173 to determine a change of direction.

In an implementation, a walking dead reckoning mode of position measurement detects an axis of periodic sudden accelerations using the accelerometer 172 and counts the periodic accelerations as steps of the user. This axis changes and measurements are updated if the device is reoriented by a user while walking. In an implementation, the device can be configured to switch to a walking mode of dead reckoning position measurement upon the detection of periodic accelerations.

In an implementation, steps are counted by contact indications detected by impact sensors of footwear of the user. If only one shoe has an impact sensor, the number of impacts can be doubled to arrive at a step count. A pedometer function can calculate the product of the user's average stride and the step count to determine a distance traversed. Accelerations in axes perpendicular to the axis of periodic acceleration are measured to determine changes in direction. In an implementation, accelerations in axes perpendicular to the axis of periodic acceleration are compared with rotations detected by the gyroscope 175 to determine a change of direction. In an implementation, accelerations in axes perpendicular to the axis of periodic acceleration are compared with rotations detected by the magnetic compass 173 to determine a change of direction. In an implementation, the walking mode combines pedometer functions with compass measurements without use of accelerometer or gyroscope data.

Referring again to the example synchronization settings screen 600, the "auto-enable dead-reckoning when GPS unavailable" button 612 is shown as enabled. In an implementation, enabling this feature causes the mobile device 100 to automatically switch to a dead-reckoning mode when GPS location information is unavailable from the vehicle device(s) 405 and mobile device 100. For example, this may occur when communication between the mobile device 100 and vehicle device(s) 405 ceases.

The "auto-update device or vehicle with new information" button 614 is shown as enabled. In an implementation, when this button is active new information stored in the mobile device 100 and/or vehicle device(s) 405 will automatically be provided to the other device. According to an implementation, new information is information stored in the mobile device 100 and/or vehicle device(s) 405 since the last synchronization of the mobile device 100 and vehicle device(s) 405. New information can include location information or any other information stored in the devices, such as contact information. A "resolve conflict in favor of" selection 616 is shown. When the "auto-update device or vehicle with new information" button 614 is enabled at least one of the "device" button 618 and "vehicle" button 620 are toggled to an active state. FIG. 6 shows the "device" button 618 as active. In an implementation, when conflicts occur between information stored in the mobile device 100 and vehicle device(s) 405, the "resolve conflict in favor of" selection 616 determines which device's information is copied onto the other device.

According to an implementation, when conflicts between data on the vehicle device(s) 405 and mobile device 100 occur, the user may be alerted. The user may be able to resolve the conflict in favor of either the vehicle device(s) 405 or mobile device 100 on an item by item basis, or based on a category of information (e.g., telephone numbers, calendar entries, etc.). This may be a hot sync feature of the device.

A "view advanced synchronization settings" button 622 is shown. According to an implementation, selection of this button 622 permits a user to configure advanced synchronization settings, including reconciliation settings when conflicts occur. For instance, a user may select, on an item by item basis, whether the mobile device 100 or vehicle device(s) 405 should govern in the event of a conflict. Items may be individually toggled, such as contacts, calendar entries, telephone numbers, destinations, points of interest, and the like. According to an implementation, selection of this button 622 permits a user to configure whether synchronization occurs on an item by item basis. Other advanced settings, such as a schedule or time for synchronization to occur (if not in real-time or in near real-time) may be established by a user.

Figure 7:
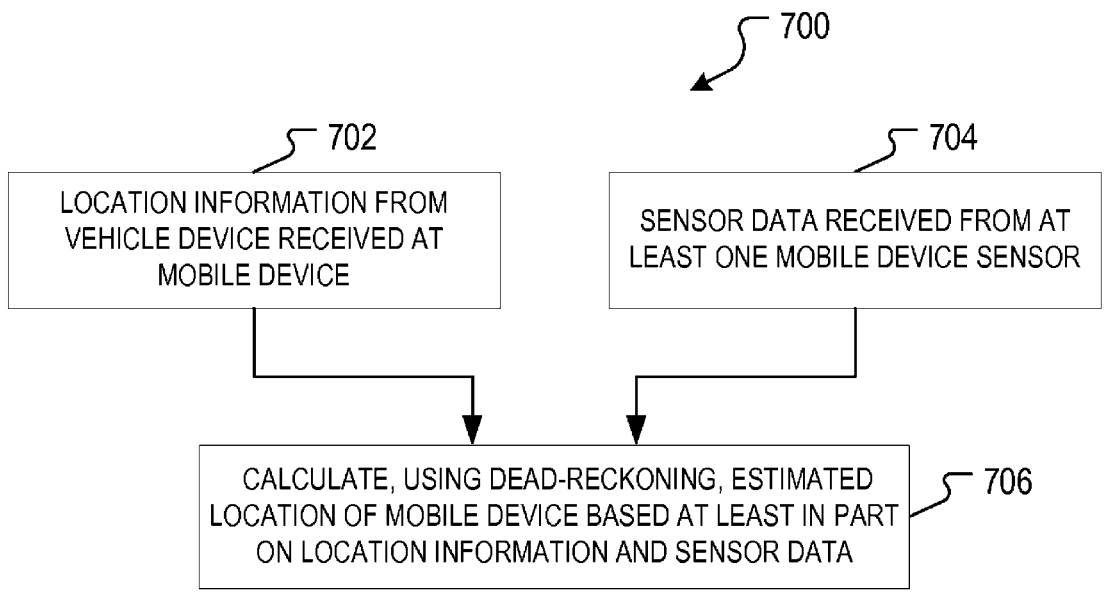
FIG. 7 is a flowchart of an example process for determining the location of a mobile device using information provided from a vehicle device.

FIG. 7 is a flowchart of an example process 700 for determining the location of a mobile device using information provided from a vehicle device. The process 700 can, for example, be implemented in a processing device, such as the mobile device 100 of FIG. 1, implementing user processing in software and/or hardware.

Location information stored in a memory of a vehicle device is received at a mobile device (702). For example, latitude and longitude information may be transmitted to the memory 350 of the mobile device from a GPS receiver located in an automobile. According to an implementation, the location information may be received via the other input/control devices 348 and/or via the wireless communication subsystem(s) 324.

Sensor data is received from at least one sensor of or associated with the mobile device (704). According to an implementation, one or more processors 304 of the mobile device can receive sensor data is received from one or all of the accelerometer 172, compass 173, and/or gyroscope 175. Using an on board clock, the processor(s) 304 can, for example, interpret the sensor data as movements of the device 100. Using acceleration data, for example, the processor(s) 304 can determine velocity, and position. Alternatively, or in addition, compass data can be used to determine a heading. In some implementations a number of steps and user stride information can be used to determine a distance walked.

Next, an estimated location of the mobile device is calculated based at least in part on the location information and the sensor data (706). According to an implementation, other software instructions 372 stored in the mobile device can utilize the location information provided by the vehicle device as a starting point for estimating the location of the mobile device, and the sensor data processed by the one or more processors 304 identify movements that are measured relative to the starting point to estimate a position using dead reckoning.

Figure 8:
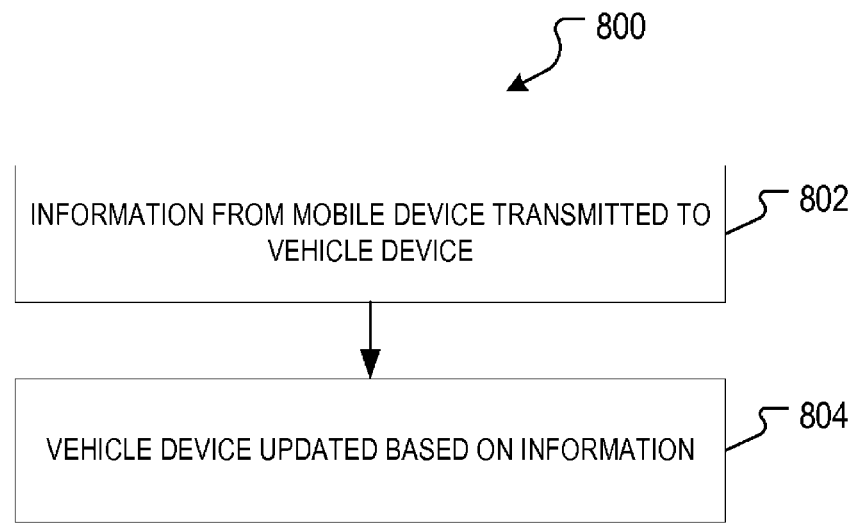
FIG. 8 is a flowchart of an example process for updating a vehicle device based on information provided by a mobile device.

FIG. 8 is a block diagram of an example process 800 of synchronizing a vehicle device and a mobile device. Information from a mobile device is transmitted to a vehicle device (802). According to an implementation, the information can include location information and/or other information identified and/or stored by the mobile device. For instance, the information transmitted to the vehicle device can include one or more telephone numbers, addresses, names, email addresses, the location of a desired destination, the location or identity of an object, navigation information (including routes), addresses, calendar entries, telephone numbers, destinations, configuration settings, historical route information, points of interest, and the like. The vehicle device is then updated based on the received information (804). According to an implementation, prior to updating the vehicle device, the vehicle device can compare the received information to stored information. According to an implementation, only new information received from the mobile device may be updated by the vehicle device.

Figure 9:
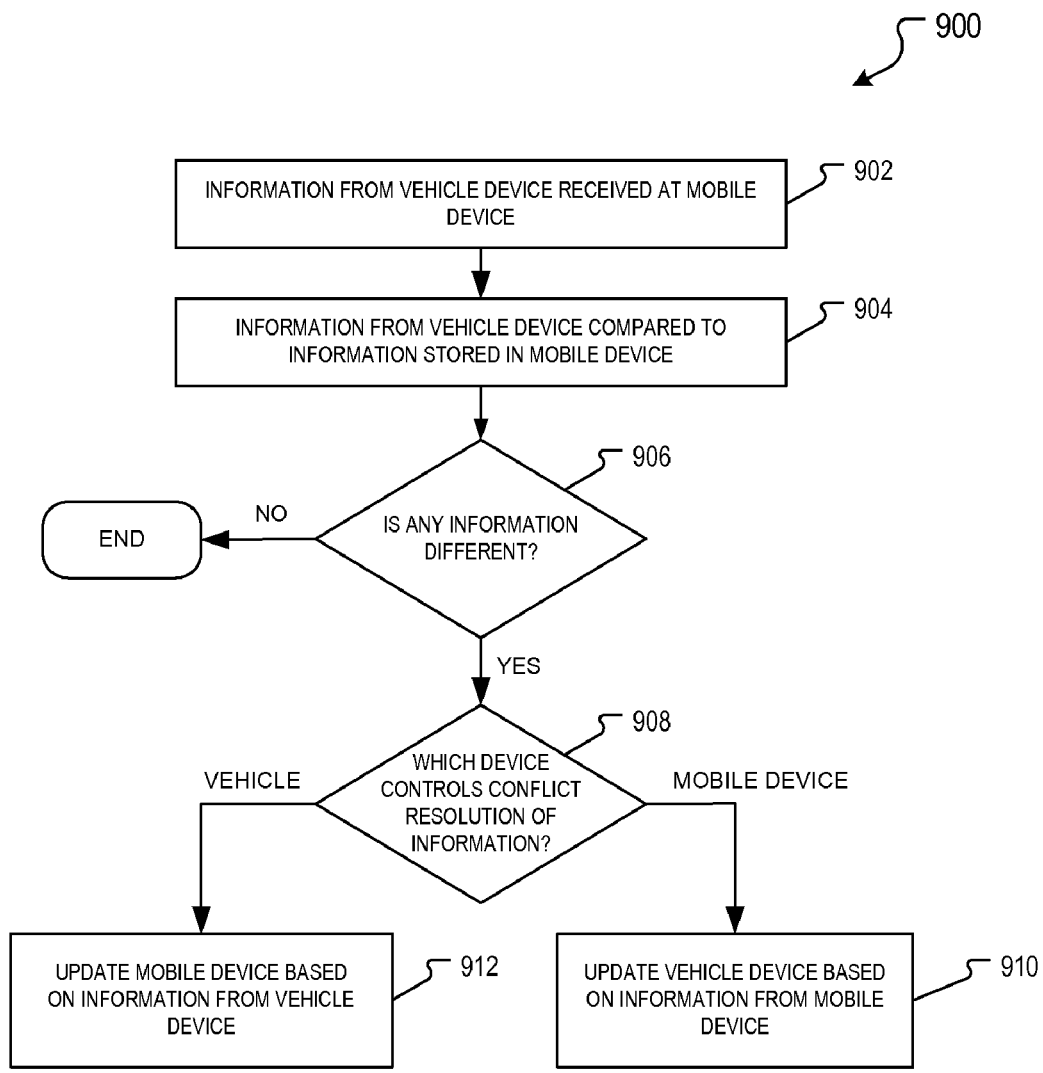
FIG. 9 is a flowchart of an example process for synchronizing a vehicle device and a mobile device.

FIG. 9 is a block diagram of an example process 900 of synchronizing a vehicle device and a mobile device. Information from a vehicle device is transmitted to a mobile device (902). According to an implementation, the information can include location information and/or other information identified and/or stored by the vehicle device. For instance, the information can include one or more telephone numbers, addresses, names, email addresses, the location of a desired destination, the location or identity of an object, navigation information (including routes), addresses, calendar entries, telephone numbers, destinations, configuration settings, historical route information, points of interest, and the like.

The information received from the vehicle device is compared to information stored in the mobile device (904). If no new information is identified, the synchronization process terminates (906). According to an implementation, the process may restart immediately. If any information is different (906), the device that controls conflict resolution is identified (908). According to an implementation, this may be set by a user via synchronization settings, as described with respect to FIG. 6. If the vehicle device controls conflict resolution, the mobile device is updated (912). Alternatively, if the mobile device controls conflict resolution, the vehicle device is updated (910). According to an implementation, the updating may be performed by other software instructions 372 stored within a memory 350 of the mobile device.

Although reference is made herein to communication (including synchronization) between the mobile device and a vehicle device, other device types may take the place of the vehicle device in the present disclosure. For example, the mobile device may communicate with another mobile device, such as a like mobile device or another a handheld device such as a computer, PDA, GPS device, telephone, or the like. Thus, the mobile device may synchronize and/or obtain information from another mobile device using the methods and systems described herein.

Although reference is made herein to communication (including synchronization) between the mobile device and a vehicle device, other device types may take the place of the vehicle device in the present disclosure. For example, the mobile device may communicate with another mobile device, such as a like mobile device or another handheld device such as a computer, PDA, GPS device, telephone, or the like. Thus, the mobile device may synchronize and/or obtain information from another mobile device using the methods and systems described herein.

What is claimed is:

1. A method executed by a mobile device, comprising:
receiving, at a mobile device and through a wired or wireless connection, location information stored in a memory of a vehicle device, the location information comprising location coordinates of a destination of the vehicle device;
setting a starting location of the mobile device based on the location coordinates of the destination;
receiving sensor data from at least one sensor measuring movement of the mobile device; and
calculating an estimated location of the mobile device based on the starting location and the sensor data.

2. The method of claim 1, wherein the location information comprises location coordinates of the vehicle device, the location of the vehicle device being determined by a GPS system.

3. The method of claim 1, further comprising determining movements of the mobile device based on the sensor data.

4. The method of claim 3, wherein calculating the estimated location of the mobile device comprises at least one of:
calculating the estimated location using dead reckoning based on the starting location and the movements determined from the sensor data; or
calculating the estimated location using real time location update from the vehicle device.

5. The method of claim 1, wherein the at least one sensor comprises an accelerometer, a gyroscope, or a compass.

6. The method of claim 1, further comprising:
receiving, at the mobile device, vehicle diagnostic information from the vehicle device.

7. The method of claim 1, further comprising:
updating the starting location of the mobile device using location information received from another vehicle device when the mobile device is located proximate to the other vehicle device.

8. The method of claim 1, wherein:
the at least one sensor is configured to measure walking steps of a user of the mobile device; and
calculating the estimated location of the mobile device includes calculating the estimated location using dead reckoning based on the starting location and the measured walking steps.

9. The method of claim 1, comprising: determining that the mobile device is located proximate to the vehicle device before receiving the location information stored in the memory of the vehicle device.

10. A storage device storing instructions, the instructions operable to cause a mobile device to perform operations comprising:
receiving, at a mobile device and through a wired or wireless connection, location information stored in a memory of a vehicle device, the location information comprising location coordinates of a destination of the vehicle device;
setting a starting location of the mobile device based on the location coordinates of the destination;
receiving sensor data from at least one sensor measuring movement of the mobile device; and
calculating an estimated location of the mobile device based on the starting location and the sensor data.

11. The storage device of claim 10, wherein the location information comprises a location of the vehicle device, the location of the vehicle device being determined by a GPS system.

12. The storage device of claim 11, wherein the at least one sensor comprises an accelerometer, a gyroscope, or a compass.

13. The storage device of claim 10, the operations further comprising:
updating the starting location of the mobile device using location information received from another vehicle device when the mobile device is located proximate to the other vehicle device.

14. The storage device of claim 13, wherein updating the starting location of the mobile device based on the location information includes determining the starting location of the mobile device relative to a location to the other vehicle device using a gyroscope and an accelerometer.

15. The storage device of claim 10, where the mobile device is in communication with the vehicle device during the setting of the mobile device via a wireless communication.

16. The storage device of claim 10, the operations further comprising determining movements of the mobile device based on the sensor data.

17. The storage device of claim 16, wherein calculating the estimated location of the mobile device comprises calculating the estimated location using dead reckoning based on the starting location and the movements determined from the sensor data.

18. A portable electronic device, comprising:
one or more processors, the portable electronic device configured to perform operations comprising:
receiving, at the portable electronic device and through a wired or wireless connection, location information stored in a memory of a vehicle device, the location information comprising location coordinates of a destination of the vehicle device;
setting a starting location of the portable electronic device based on the location coordinates of the destination;
receiving sensor data from at least one sensor of the portable electronic device; and
calculating an estimated location of the portable electronic device based on the starting location and the sensor data.

19. The portable electronic device of claim 18, wherein the location information comprises location coordinates of the vehicle device, the location coordinates of the vehicle device being determined by a GPS system.

20. The portable electronic device of claim 19, wherein calculating the estimated location of the portable electronic device includes calculating the estimated location using dead reckoning.

21. The portable electronic device of claim 19, wherein the at least one sensor comprises an accelerometer, a gyroscope, or a compass.

22. The portable electronic device of claim 19, the operations further comprising:

updating the starting location of the device using location information received from another vehicle device when the device is located proximate to another vehicle device.

23. The portable electronic device of claim 19, the operations comprising determining movements of the portable electronic device based on the sensor data.

24. The portable electronic device of claim 23, wherein calculating the estimated location of the portable electronic device comprises at least one of:

calculating the estimated location using dead reckoning based on the starting location and the movements determined from the sensor data; or calculating the estimated location using real time location update from the vehicle device.

* * * * *